(12) United States Patent
Fan et al.

(10) Patent No.: US 11,714,163 B2
(45) Date of Patent: Aug. 1, 2023

(54) ACOUSTIC COLLISION DETECTION AND LOCALIZATION FOR ROBOTIC DEVICES

(71) Applicant: SAMSUNG ELECTRONICS CO., LTD., Suwon-si (KR)

(72) Inventors: Xiaoran Fan, Fords, NJ (US); Yuan Chen, New York, NY (US); Dae Won Lee, Princeton, NJ (US); Colin Prepscius, New York, NY (US); Ibrahim Volkan Isler, Saint Paul, MN (US); Lawrence David Jackel, Holmdel, NJ (US); Hyunjune Sebastian Seung, Princeton, NJ (US); Daniel Dongyuel Lee, Tenafly, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 17/084,257

(22) Filed: Oct. 29, 2020

(65) Prior Publication Data

US 2021/0293918 A1    Sep. 23, 2021

Related U.S. Application Data

(60) Provisional application No. 62/991,202, filed on Mar. 18, 2020.

(51) Int. Cl.
*G01S 5/22* (2006.01)
*B25J 19/02* (2006.01)

(52) U.S. Cl.
CPC ............. *G01S 5/22* (2013.01); *B25J 19/026* (2013.01)

(58) Field of Classification Search
None
See application file for complete search history.

(56) References Cited

U.S. PATENT DOCUMENTS

2007/0237027 A1* 10/2007 Sugiura ............... B60R 21/0134
                                                                    701/45
2008/0119993 A1*  5/2008 Breed ................... G01S 13/931
                                                                    701/45

(Continued)

FOREIGN PATENT DOCUMENTS

CN    103954958 A  *  7/2014  ............. G01N 29/32
CN    103988060 A  *  8/2014  ......... G01D 5/35374

(Continued)

OTHER PUBLICATIONS

Cho, Compliant Ultrasound Proximity Sensor for the Safe Operation of Human Friendly Robots Integrated with Tactile Sensing Capability, J Electr Eng Technol; 12(1): 310-316 (Year: 2017).*

(Continued)

*Primary Examiner* — Isam A Alsomiri
*Assistant Examiner* — Vikas Atmakuri
(74) *Attorney, Agent, or Firm* — Sughrue Mion, PLLC

(57) ABSTRACT

A method of collision localization on a robotic device includes obtaining audio signals from a plurality of acoustic sensors spaced apart along the robotic device; identifying, based on a collision being detected, a strongest audio signal; identifying a primary onset time for an acoustic sensor producing the strongest audio signal, the primary onset time being a time at which waves propagating from the collision reach the acoustic sensor producing the strongest audio signal; generating a virtual onset time set, by shifting a calibration manifold, based on the identified primary onset time, the calibration manifold representing relative onset times from evenly spaced marker locations on the robotic device to the plurality of acoustic sensors; determining scores for the marker locations based a standard deviation of elements in the virtual onset time set; and estimating a (Continued)

location of the collision based on a highest score of the determined scores.

16 Claims, 20 Drawing Sheets

(56) References Cited

U.S. PATENT DOCUMENTS

| | | | | |
|---|---|---|---|---|
| 2010/0198528 A1* | 8/2010 | McCauley | ............... | G01S 5/22 702/56 |
| 2010/0214873 A1* | 8/2010 | Somasundaram | ... | H05K 7/1498 367/99 |
| 2012/0327746 A1* | 12/2012 | Velusamy | ................. | G01S 5/22 367/127 |
| 2014/0152507 A1* | 6/2014 | McAllister | ......... | G06K 7/10376 342/126 |
| 2016/0125739 A1* | 5/2016 | Stewart | ................... | B63B 43/18 701/301 |
| 2020/0023525 A1 | 1/2020 | Miyamoto et al. | | |
| 2020/0061835 A1 | 2/2020 | Haddadin et al. | | |

FOREIGN PATENT DOCUMENTS

| | | | | | |
|---|---|---|---|---|---|
| CN | | 108802685 A | * | 11/2018 | ............... G01S 5/22 |
| CN | | 109061558 A | * | 12/2018 | ............... G01S 3/80 |
| KR | 10-2015-0080050 A | | | 7/2015 | |
| WO | WO-2015075463 A1 | | * | 5/2015 | ............. A61B 34/30 |

OTHER PUBLICATIONS

Zoller; Acoustic Sensing for Soft Pneumatic Actuators; IEEE/RSJ International Conference on Intelligent Robots and Systems (IROS); 6986-6991 (Year: 2018).*

* cited by examiner

ACOUSTIC COLLISION DETECTION AND LOCALIZATION FOR ROBOTIC DEVICES

CROSS-REFERENCE TO RELATED APPLICATION(S)

This application is based on and claims priority under 35 U.S.C. § 119 to U.S. Provisional Patent Application No. 62/991,202, filed on Mar. 18, 2020, in the U.S. Patent & Trademark Office, the disclosure of which is incorporated by reference herein in its entirety.

BACKGROUND

1. Field

The disclosure relates to a method of acoustic collision detection and localization on a robotic device, and an apparatus for the same, and more particularly to a method of collision detection and localization based on detected audio signals, and an apparatus for the same.

2. Description of Related Art

Robotic devices typically include components that move as the robot functions. During operation, a component may collide with an external object which may causing harm to the robot or the external object. A collision may be localized so the robotic device can retreat without further damaging the robot or the external object. Accordingly, wireless localization of a collision is important for many robotic devices.

Sound waves resulting from collisions that happen between robots and surrounding obstacles are impulsive in nature. These impulse waves are typically lamb waves (plate waves) because robots are generally constructed with solid plates. The ratio of wavelength to thickness of the robot plates is typically large. For example, if a 50 Hz wave propagates in the robot with a velocity of 1000 m/s, the wavelength is equal to 20 m, which is much larger than the thickness of robot plates (typically less than 1 cm).

Plate wave propagation in robots is of a dispersive nature, which causes different frequency components to have different velocities. If three microphones are sequentially mounted along a robot arm at locations A, C and D, and a collision happens at location B, which is located between A and C, due to the dispersion, each microphone will receive dissimilar signals from the same collision, which makes correlation based time distance of arrival (TDoA) methods infeasible. Furthermore, even for the same frequency, plate wave propagation velocity depends on the robot structural and material characteristics, such as modulus of elasticity, density, Poisson's ratio, and slab thickness. Even with the on-robot distance dAB<dBD, due to the robot structural heterogeneity, the microphone at location D might receive the collision earlier than the microphone at location A. The heterogeneity consequently hinders the system determining the onset time or TDoA. Lastly, the relative location of each microphone changes as the robot arm moves around, making triangle based localization algorithms not feasible.

SUMMARY

One embodiment provides a method of wirelessly localizing a collision by calibrating microphones' P-wave TDoA for a robotic device into a one dimensional manifold. A scoring function is then used to localize the collision.

According to an aspect of the disclosure, a method of collision localization for a robotic device includes obtaining audio signals from a plurality of acoustic sensors spaced apart along the robotic device; identifying, based on a collision being detected, a strongest audio signal among the obtained audio signals; identifying a primary onset time for an acoustic sensor producing the strongest audio signal, the primary onset time being a time at which waves propagating from the collision reach the acoustic sensor producing the strongest audio signal; generating a virtual onset time set, by shifting a calibration manifold, based on the identified primary onset time, the calibration manifold representing relative onset times from evenly spaced marker locations on the robotic device to the plurality of acoustic sensors; determining scores for the marker locations based a standard deviation of elements in the virtual onset time set; and estimating a location of the collision based on a highest score of the determined scores.

Obtaining the audio signals from the plurality of acoustic sensors may include filtering raw audio signals with a band stop filter if the robotic device is moving or passing the raw audio signals if the robotic device is static. A center frequency of the band stop filter may correspond to a fundamental frequency of a motor powering the robotic device.

Detecting the collision may include filtering the obtained audio signals to provide low pass audio signals and high pass audio signals for the obtained audio signals; and detecting the collision based on a low pass signal, from one obtained audio signal among the obtained audio signals, being above a first threshold, and a high pass signal from the one obtained audio signal, being above a second threshold.

The method may further include generating the calibration manifold. Generating the calibration manifold may include sequentially colliding an object with each marker location and obtaining onset times for the plurality of acoustic sensors; obtaining relative onset times for the collisions by subtracting a shortest onset time of each collision from each remaining onset time of the collision; and combining the relative onset times to generate the calibration manifold.

The calibration manifold may be an M×N dimension manifold where M corresponds to an amount of marker locations and N corresponds to an amount of acoustic sensors.

Generating the calibration manifold may include obtaining onset time differences between adjacent acoustic sensors of the plurality of acoustic sensors; and cleansing the calibration manifold based on the onset time differences between adjacent acoustic sensors.

Identifying the primary onset time for the acoustic sensor producing the strongest audio signal may include identifying a first peak in the strongest audio signal that is above a predetermined energy threshold. The predetermined energy threshold may be 3× a standard deviation of the strongest audio signal.

Estimating the location of the collision based on the highest score of the determined scores may include obtaining an interpolation of a highest scoring marker location and marker locations adjacent the highest scoring marker location; and estimating the location of the collision based on a position of a peak of the interpolation.

Obtaining the interpolation of the highest scoring marker location and marker locations adjacent the highest scoring marker location may include generating a quadratic fit curve for the highest scoring marker location and marker locations adjacent the highest scoring marker location.

According to another aspect of the disclosure, a robotic device may include a plurality of acoustic sensors spaced apart along the robotic device; a memory configured to store instructions; and a processor configured to execute the instructions to obtain audio signals from the plurality of acoustic sensors; identify, based on a collision being detected, a strongest audio signal among the obtained audio signals; identify a primary onset time for an acoustic sensor producing the strongest audio signal, the primary onset time being a time at which waves propagating from the collision reach the acoustic sensor producing the strongest audio signal; generate a virtual onset time set, by shifting a calibration manifold, based on the identified primary onset time, the calibration manifold representing relative onset times from evenly spaced marker locations on the robotic device to the plurality of acoustic sensors; determine scores for the marker locations based a standard deviation of elements in the virtual onset time set; and estimate a location of the collision based on a highest score of the determined scores.

The processor may be further configured to filter raw audio signals with a band stop filter if the robotic device is moving or pass the raw audio signals if the robotic device is static.

The processor may be further configured to filter raw audio signals with a band stop filter if the robotic device is moving or pass the raw audio signals if the robotic device is static. A center frequency of the band stop filter may correspond to a fundamental frequency of a motor powering the robotic device.

The processor may be further configured to filter the obtained audio signals to provide low pass audio signals and high pass audio signals for the obtained audio signals; and detect the collision based on a low pass signal, from one obtained audio signal among the obtained audio signals, being above a first threshold, and a high pass signal from the one obtained audio signal, being above a second threshold.

The processor may be further configured to generate the calibration manifold. Generating the calibration manifold may include, based on an object sequentially colliding with each marker location, obtaining onset times for the plurality of acoustic sensors; obtaining relative onset times for the collisions by subtracting a shortest onset time of each collision from each remaining onset time of the collision; and combining the relative onset times to generate the calibration manifold.

The calibration manifold may be an M×N dimension manifold where M corresponds to an amount of marker locations and N corresponds to an amount of acoustic sensors.

The processor may be further configured to obtain onset time differences between adjacent acoustic sensors of the plurality of acoustic sensors; and cleans the calibration manifold based on the onset time differences between adjacent acoustic sensors.

The processor may be further configured to identify a first peak in the strongest audio signal that is above a predetermined energy threshold, and wherein the predetermined energy threshold is 3× a standard deviation of the strongest audio signal.

The processor may be further configured to obtain an interpolation of a highest scoring marker location and marker locations adjacent the highest scoring marker location; and estimate the location of the collision based on a position of a peak of the interpolation.

The processor may be further configured to generate a quadratic fit curve for the highest scoring marker location and marker locations adjacent the highest scoring marker location.

According to another aspect of the disclosure, a non-transitory computer-readable medium may store storing instructions including one or more instructions that, when executed by one or more processors of a mobile device, cause the one or more processors to obtain audio signals from a plurality of acoustic sensors on a robotic device; identify, based on a collision being detected, a strongest audio signal among the obtained audio signals; identify a primary onset time for an acoustic sensor producing the strongest audio signal, the primary onset time being a time at which waves propagating from the collision reach the acoustic sensor producing the strongest audio signal; generate a virtual onset time set, by shifting a calibration manifold, based on the identified primary onset time, the calibration manifold representing relative onset times from evenly spaced marker locations on the robotic device to the plurality of acoustic sensors; determine scores for the marker locations based a standard deviation of elements in the virtual onset time set; and estimate a location of the collision based on a highest score of the determined scores.

The instructions may further cause the one or more processors to obtain an interpolation of a highest scoring marker location and marker locations adjacent the highest scoring marker location; and estimate the location of the collision based on a position of a peak of the interpolation.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 1:
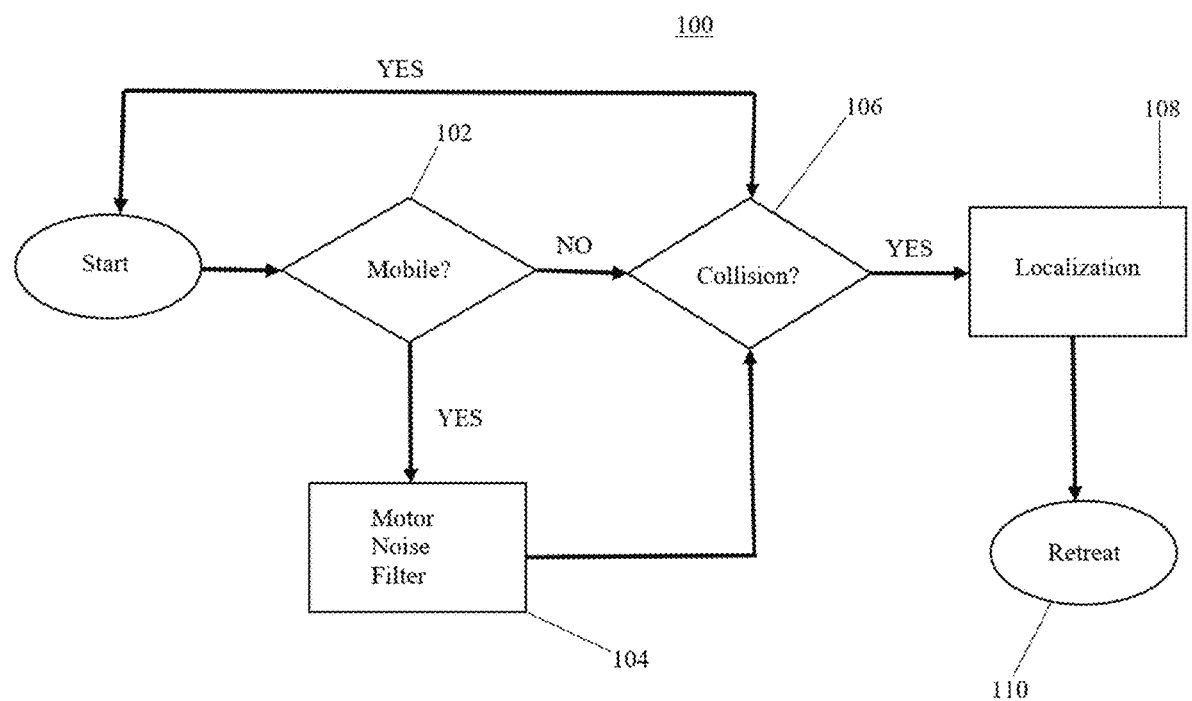
FIG. 1 is a diagram of an overview of a method for detecting and localizing a collision on a robotic device according to an embodiment.

FIG. 1 is a diagram of an overview of a method 100 for detecting and localizing a collision on a robotic device based on acoustic signals detected by acoustic sensors on the robotic device.

As shown in FIG. 1, at operation 102, the method 100 may determine whether the robotic device is moving or static. If the robotic device is moving, acoustic waves may be produced by motors or actuators that control movement of the robotic device. These acoustic waves produced by the motors or actuators may create noise in audio signals produced by acoustic sensors on the robotic device. Accordingly, if the robotic device is determined to be moving, the motor noise may be filtered out of the signals produced by the acoustic detectors at operation 104 before progressing to collision detection at operation 106. Alternatively, if the device is determined to be static, the collision detection may be performed without performing motor noise filtering at operation 104.

In operation 104, the motor noise may be attenuated by passing the produced audio signals through frequency specific filters. For example, if the natural frequency of the robotic device's motors are focused around 100 Hz, a band stop filter centered at 100 Hz may be applied to detected audio signals.

In operation 106, a collision between an external object and the robotic device (on-robot collision) may be detected by analyzing the audio signals produced by the acoustic sensors. To prepare the audio signals for collision detection analysis, the signals may be processed to remove portions of the signal that are caused by i. collisions in the surrounding environment which travel to the acoustic sensors over-the-air (OTA) and ii. collisions with the supporting structure of the robotic device that travel to the acoustic sensors trough the body of the robotic device (OTF). The OTA collisions may be attenuated by passing the audio signals through a low pass filter and the OTF collisions may be attenuated by passing the audio signals through a high pass filter. The low pass filtered and the high pass filtered signals may then be compared to thresholds to determine the presence of an on-robot collision.

If an on-robot collision is detected, in operation 108, the collision may be localized through analyzing the audio signals, which may have been filtered to remove motor noise as discussed above. To localize the collision, an onset time (time for collision waves to reach the acoustic sensors) for the acoustic sensor producing the strongest signal is obtained. A virtual onset time set is then created to determine the onset times for the other acoustic sensors. The virtual onset time set may be obtained by shifting a premade calibration manifold based on the obtained onset time. The calibration manifold may represent relative onset times for the acoustic sensors based on collisions at evenly spaced marker locations during a calibration process.

Once the virtual onset time set is obtained, the marker locations may be scored based on an amount of oscillation in the elements of the virtual onset time set related to respective marker locations. A curve may then be interpolated based on a maximum marker location score and scores of the marker locations adjacent the maximum score. The location of the collision may be estimated, with respect to the location of the calibration markers, based on a peak of the interpolated curve.

In operation 110, once the collision is detected and localized, the robotic device may retreat based on the location of the collision.

Figure 2:
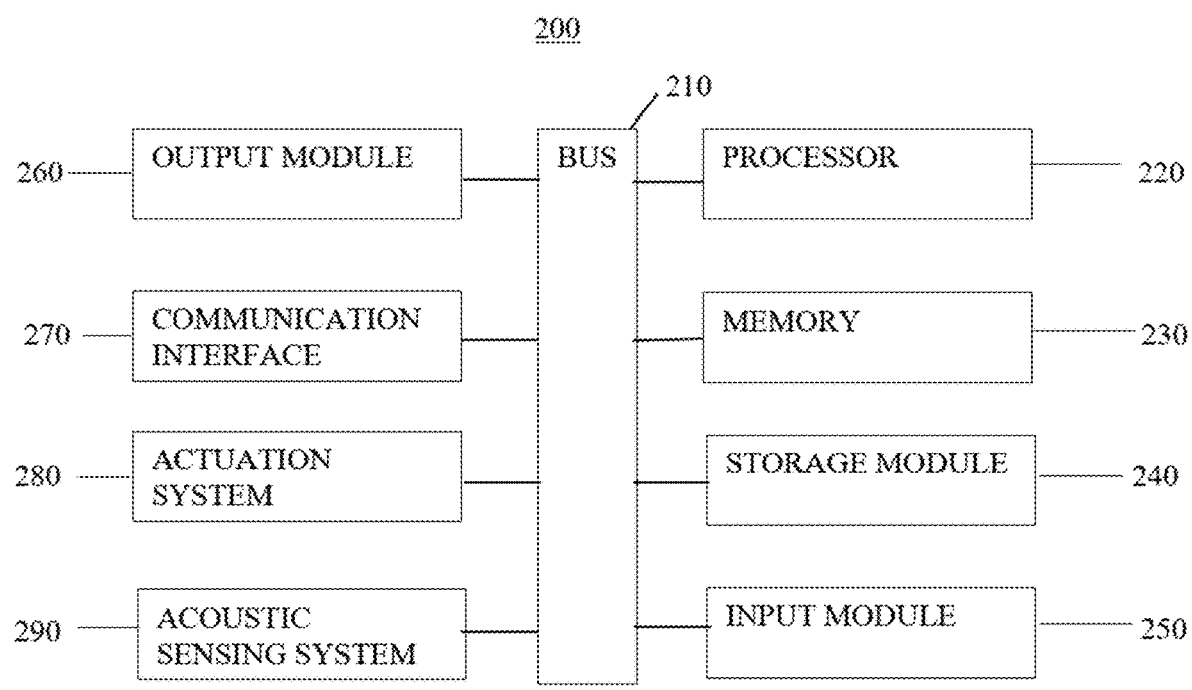
FIG. 2 is a diagram of components of a robotic device according to an embodiment.

FIG. 2 is a diagram of example components of a robotic device 200 according to an embodiment. As shown in FIG. 2, the robotic device 200 may include a bus 210, a processor 220, a memory 230, a storage module 240, an input module 250, an output module 260, a communication interface 270, an actuation system 280, and an acoustic sensing system 290.

The bus 210 may include a component that permits communication among the components of the robotic device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 may include one or more processors capable of being programmed to perform a function. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage module 240 may store information and/or software related to the operation and use of the robotic device 200. For example, the storage module 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input module 250 may include a component that permits the robotic device 200 to receive information, such as via user input (e.g., a touch screen display, a keyboard, a keypad, a mouse, a button, a switch, and/or a microphone). Additionally, or alternatively, the input module 250 may include a sensor for sensing information (e.g., a global positioning system (GPS) component, an accelerometer, a gyroscope, and/or an actuator). The output module 260 may include a component that provides output information from the robotic device 200 (e.g., a display, a speaker, and/or one or more light-emitting diodes (LEDs)).

The communication interface 270 may include a transceiver-like component (e.g., a transceiver and/or a separate receiver and transmitter) that enables the robotic device 200 to communicate with other devices, such as via a wired connection, a wireless connection, or a combination of wired and wireless connections. The communication interface 270 may permit the robotic device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The robotic device 200 may perform one or more processes described herein. The robotic device 200 may perform these processes in response to the processor 220 executing software instructions stored by a non-transitory computer-readable medium, such as the memory 230 and/or the storage module 240. A computer-readable medium is defined herein as a non-transitory memory device. A memory device includes memory space within a single physical storage device or memory space spread across multiple physical storage devices.

Software instructions may be read into the memory 230 and/or the storage module 240 from another computer-readable medium or from another device via the communication interface 270. When executed, software instructions stored in the memory 230 and/or the storage module 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

An actuation system 280 may power movement of the robotic device 200. The actuation system 280 may include one or more motors that operate in response to instructions produced by the processor 220. The one or more motors may rotate linkages, actuate linear actuators, and/or rotate wheels of the robotic device 200.

An acoustic sensing system 290 may detect acoustic waves produced by the robotic device 200 and the surrounding environment. The acoustic sensing system 290 may transmit audio signals representing detected acoustic waves to the processor 220 for processing. Examples of acoustic sensors may include thickness-shear mode resonators, surface acoustic wave sensors, shear-horizontal plate mode sensors, flexural plate wave sensors, and other acoustic sensors known in the art.

The number and arrangement of components shown in FIG. 2 are provided as an example. In practice, the robotic device 200 may include additional components, fewer components, different components, or differently arranged components than those shown in FIG. 2. Additionally, or alternatively, a set of components (e.g., one or more components) of the robotic device 200 may perform one or more functions described as being performed by another set of components of the robotic device 200.

Figure 3A:
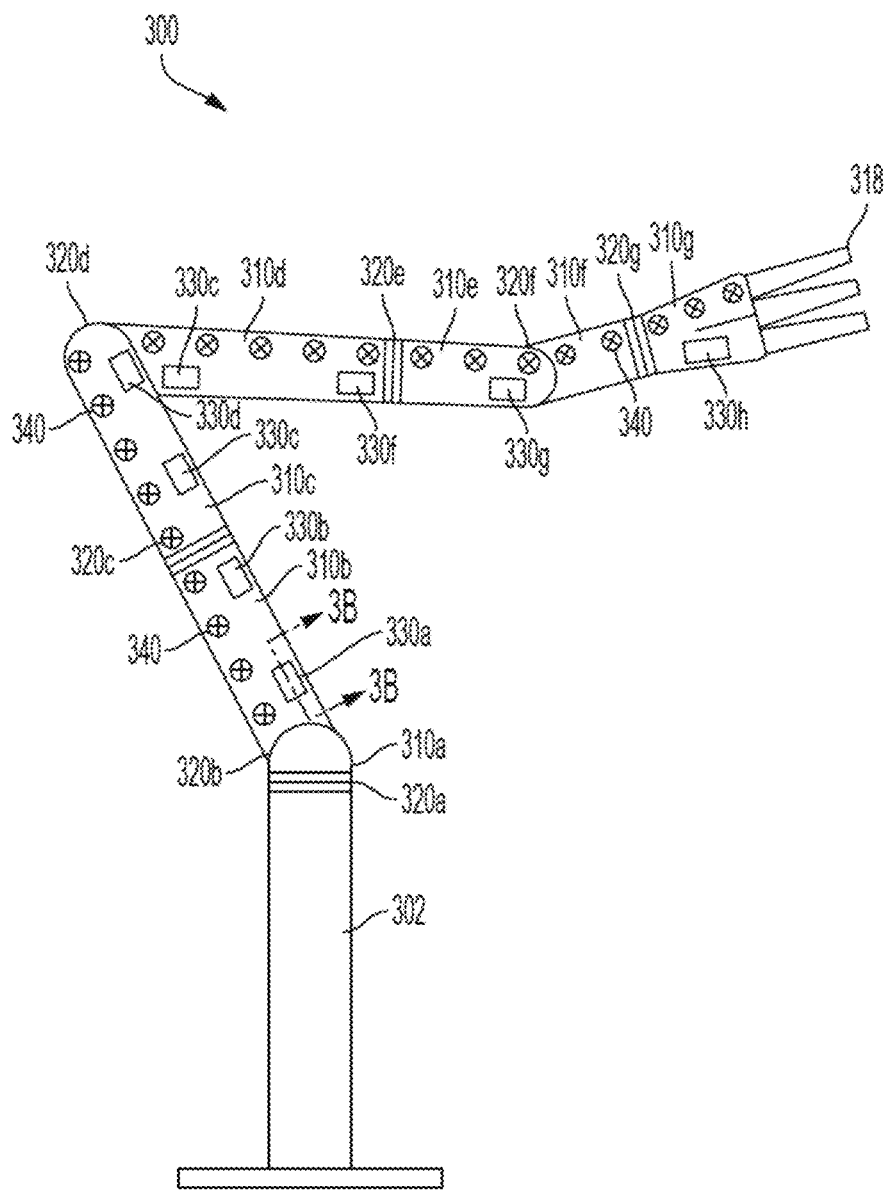
FIG. 3A is a profile view of a robotic device according to an embodiment.

FIG. 3A is a profile view of a robotic device according to an embodiment. In the example embodiment of FIG. 3A, the robotic device is a robotic arm. The robotic arm 300 is provided as merely an example and the disclosed method may be used for other robotic devices that may benefit from collision detection and localization. Non-limiting examples of robotic devices include autonomous driving vehicles, smart robots, industrial robots, human assistance robots, home assistance robots, humanoid robots, telepresence robots, articulated robots, delta robots, and cartesian robots.

As shown in FIG. 3A, the robotic arm 300 may have seven linkages 310a-310g connected by 6 joints 320a-320g, and an end effector 318 resulting in a seven degrees of freedom (DOF) robotic arm. The robotic arm 300 may be supported by a base 302.

Multiple acoustic sensors 330a-330h may be spaced apart along the robotic arm. The acoustic sensors may be spaced apart along 1 dimension, 2 dimensions, or 3 dimensions of the robotic device. For example, regarding the example embodiment shown in FIG. 3A, when the fourth linkage 310d rotates down to align with the third linkage 310c, the fourth acoustic sensor 330d and the fifth acoustic sensor 330e may be spaced apart along two dimensions (plane of the page), but remain spaced apart in a third dimension (into the page). In some non-limiting embodiments, the sensors may be evenly spaced along 1 dimension, 2 dimensions, or 3 dimensions of the robotic device.

Figure 3B:
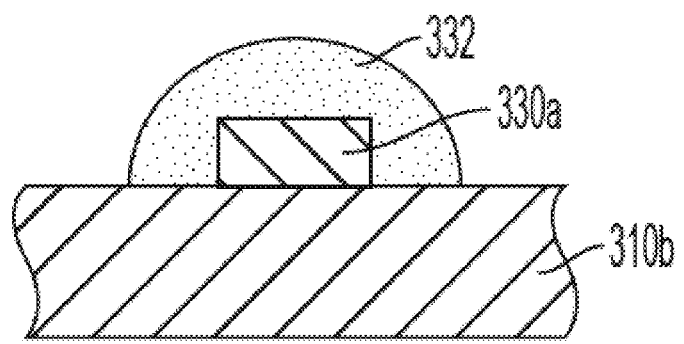
FIG. 3B is a cross-sectional view of the robotic device taken along line 3B in FIG. 3A.

FIG. 3B is a cross-sectional view of the second linkage 310b and the first acoustic sensor 330a taken along line 3B in FIG. 3A. As shown in FIG. 3B, the acoustic sensor 330a, as well as any of the other acoustic sensors 330b-330h, may be covered by a sound deadening material 332 to reduce wide band OTA sound waves. In an alternative embodiment, the acoustic sensors 330a-330h, may be provided within the linkages 310a-310g of the robotic arm 300. In this embodiment, the OTA sound waves may be deadened by the linkages 310a-310g or sound deadening material in/around the linkages 310a-310g.

Markers 340 may be evenly spaced along a length of the robotic arm for generating a calibration manifold. In the non-limiting embodiment shown in FIG. 3A, twenty-one markers 340 may be provided with 5 cm spaces between adjacent markers 340. A higher density of markers may be used for increased accuracy and a lower density of markers may be used for decreased processing and memory demands. In some non-limiting embodiments, 3 or more markers may be used.

Figure 4:
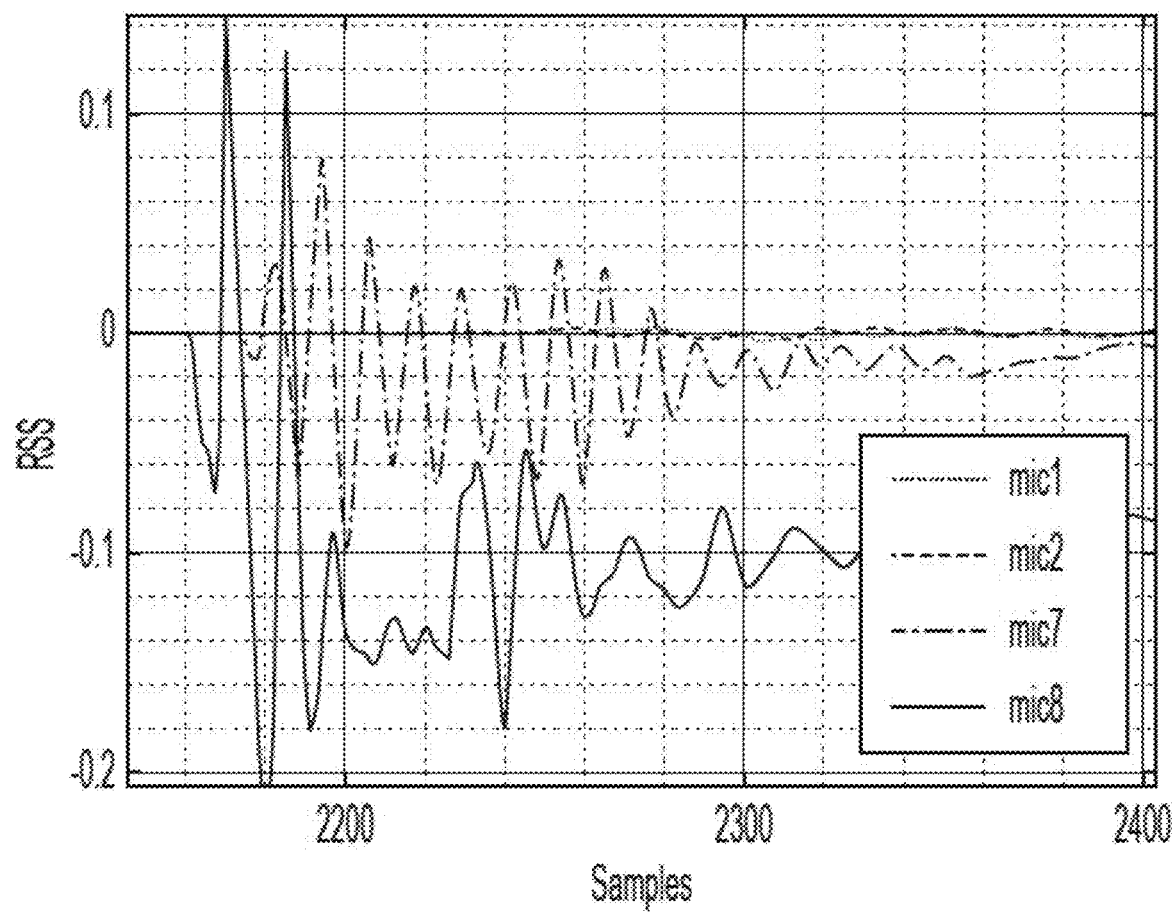
FIG. 4 is a graph showing audio signals produced by the acoustic sensors on the robotic arm according to an embodiment.

FIG. 4 is a graph showing audio signals produced by the acoustic sensors on the robotic arm according to an embodiment. In FIG. 4, a location of the collision is near acoustic sensor 330h (mlc 8) which is near acoustic sensor 330g (mlc 7), but far from acoustic sensors 330a and 330b (mlc 1 and mlc 2). As shown in FIG. 4, the peaks of the audio signal produced by the acoustic sensors 300h and 330g close to the location of the collision are large and easily identifiable compared to the peaks produced by the acoustic sensors 330a and 330b far from the location of the collision. Accordingly, onset times for each acoustic sensor may be difficult to identify based on only the signals produced by each acoustic sensor.

In addition, as discussed above, onset times alone may not provide for accurate localization due to the dispersive nature of plate wave propagation.

A process of epicenter multilateration for collision localization (EMCL) may be used to localize an on-robot collision using acoustic sensors on the robotic device. EMCL may include a calibration process that generates a device specific calibration manifold. The calibration manifold may then be shifted based on an onset time from a single acoustic sensor to determine onset times of the other acoustic sensors. The virtual onset times may then be used to localize the collision.

EMCL is based on the concept that an onset time difference between two adjacent acoustic sensors is fixed if a location of a collision is not between the two acoustic sensors. Accordingly, EMCL incorporates relative onset times between a collision and the acoustic sensors. A relative onset time vector (ROT) for a collision, which represents relative onset times for each acoustic sensor, is defined as shown in equation (1):

$$ROT = T - \min(T) \tag{1}$$

where T is the onset time set $[t_1, t_2, \ldots, t_N]$ and N is the number of acoustic sensors.

For example, if two collisions happen at different locations between acoustic sensor 330a and acoustic sensor 330b, ROT(330a)-ROT(330b) will change, but ROT(330d)-ROT(330c) will remain substantially constant. As such, when the collision location gradually moves between acoustic sensor i and acoustic sensor i+1, only ROT(i)-ROT(i+1) changes. In other words, the ROT is a one dimensional manifold in the N dimension microphone space.

EMCL involves P-wave time difference of arrival (TDoA) calibration to generate a calibration manifold $\mathcal{M}$. P-wave TDoA calibration may include evenly spacing markers along a dimension of a robotic device. An object may then be collided with the robotic device at each marker location and an ROT for each collision may be acquired. The calibration manifold $\mathcal{M}$ may be represented by a concentration of M ROTs as shown in Equation (2).

$$\mathcal{M} = [ROT_1; ROT_2; \ldots; ROT_M] \tag{2}$$

However, as shown in FIG. 4, due to the depressiveness and the attenuation of the waves propagating through the robotic arm, it may be difficult to determine accurate onset times for the acoustic sensors further away from the collision producing the waves.

As discussed above, the onset time difference between two adjacent acoustic sensors ($\Delta t(i, i+1) = t_i - t_{i+1}$) is fixed if the collision did not happen between acoustic sensors i and i+1. This relationship may be used to cleanse the calibration manifold $\mathcal{M}$.

Figure 5:
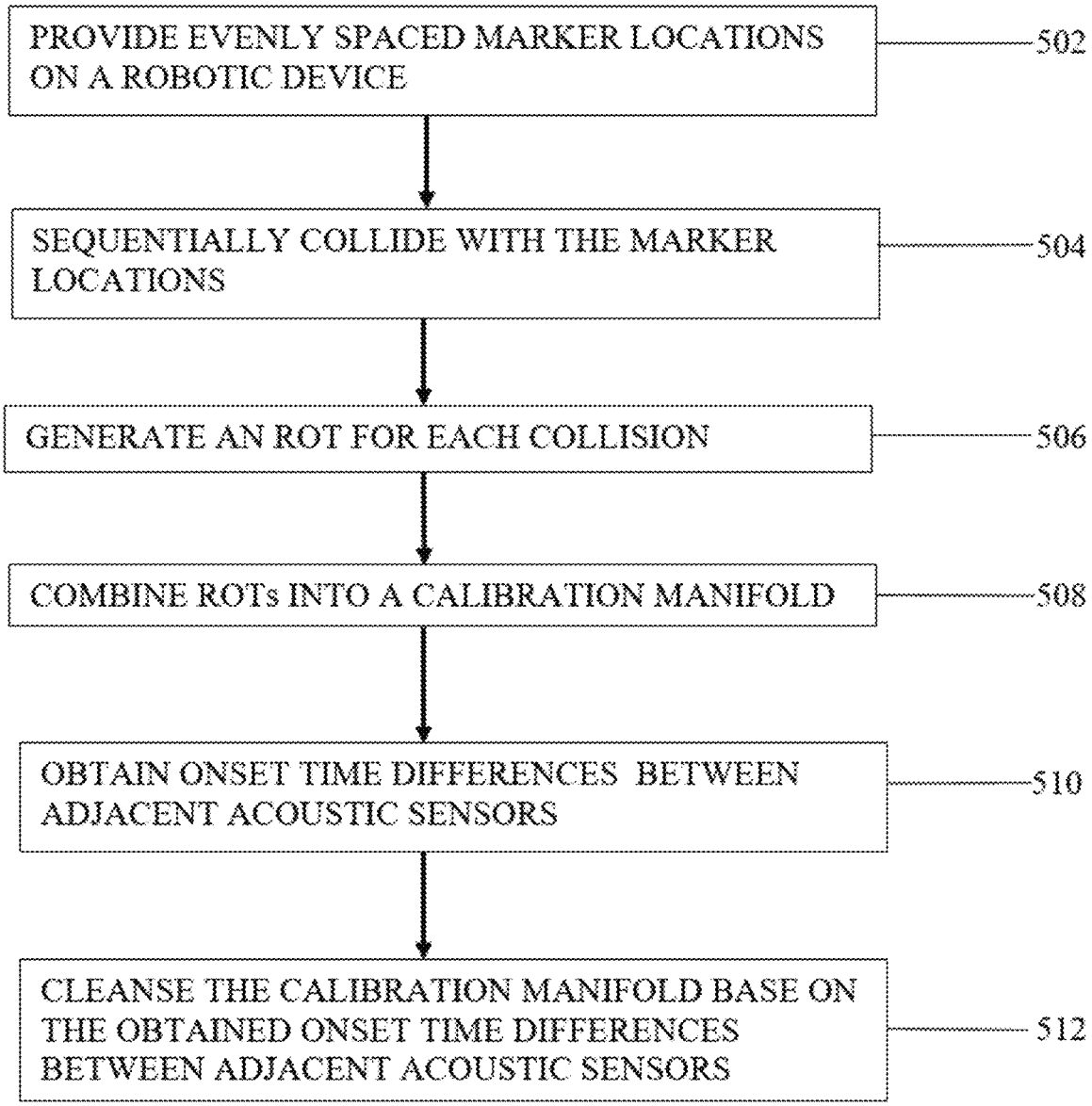
FIG. 5 is a flowchart showing a method of generating and cleansing a calibration manifold according to an embodiment.

FIG. 5 is a flowchart showing a method 500 of generating an cleansing a calibration manifold according to an embodiment. The method 500 of FIG. 5 will be described with relation to robotic arm 300 of FIG. 3 for explanatory purposes. The robotic arm of FIG. 3 is merely used as an example and the method encompasses other robotic devices.

In operation 502, multiple evenly spaced marker locations 340 may be provided on the robotic arm 300. An amount of marker locations (M) may by adjusted based on the size of the robotic arm and the required accuracy of the system. For example, increasing the amount of marker locations M may provide a more accurate localization determination. The marker locations 340 may be evenly spaced along 1 dimension of the robotic arm 300. In the example embodiment shown in FIG. 3, twenty-one makers (M=21) are evenly spaced apart along a single dimension (length) of the robotic arm.

In other embodiments, additional sets of markers may be evenly spaced along other dimensions of the robotic device. Providing markers spaced apart along additional dimensions of the robotic device will provide localization along those dimensions of the robotic device.

In operation 504, an object may be sequentially collided with each marker location.

In operation 506, an ROT for each collision is generated. As discussed above, an ROT may be obtained by determining an onset time vector for each acoustic sensor and then subtracting the minimum onset time. The onset time may indicated by a first peak of a detect signal above an energy threshold that is 3× a standard deviation of the detected signal.

In operation 508, the ROTs for each marker location may be combined into a calibration manifold $\mathcal{M}$ based on Equation 2. Accordingly, manifold $\mathcal{M}$ may be a M×N dimension manifold representing a concentration of M ROTs, where N represent an amount of acoustic sensors 330.

In operation 510, onset time differences between adjacent acoustic sensors may be obtained based on the onset times from the collisions at the marker locations. That is, by colliding near, but not in between, adjacent acoustic sensors 330, onset time differences $\Delta T$, where $\Delta T = [\Delta t(1,2), \Delta t(2,3), \ldots, \Delta t(N-1, N)]$, can be obtained.

In operation 550, the calibration manifold $\mathcal{M}$ may be cleansed using Algorithm (1).

(1)

1:    function CLEANSING ($\mathcal{M}$, $\Delta T$)
2:       V = NULL

```
 3:        for i ← 1 to M do
 4:            temp = ROT_i
 5:            index = argmin(ROT_i)
 6:            for j ← index to 1 do
 7:                if j≤2 then
 8:                    Break
 9:                else
10:                    temp(j − 2) = temp(j − 1) + ΔT (j − 2)
11:                end if
12:            end for
13:            for j ← index to N do
14:                if j≥N−1 then
15:                    Break
16:                else
17:                    temp(j + 2) = temp(j + 1) + ΔT (j + 1)
18:                end if
19:            end for
20:            V = Concatenate(V, temp)
21:        end for
22:        return V
23:    end function
```

Figure 6A:
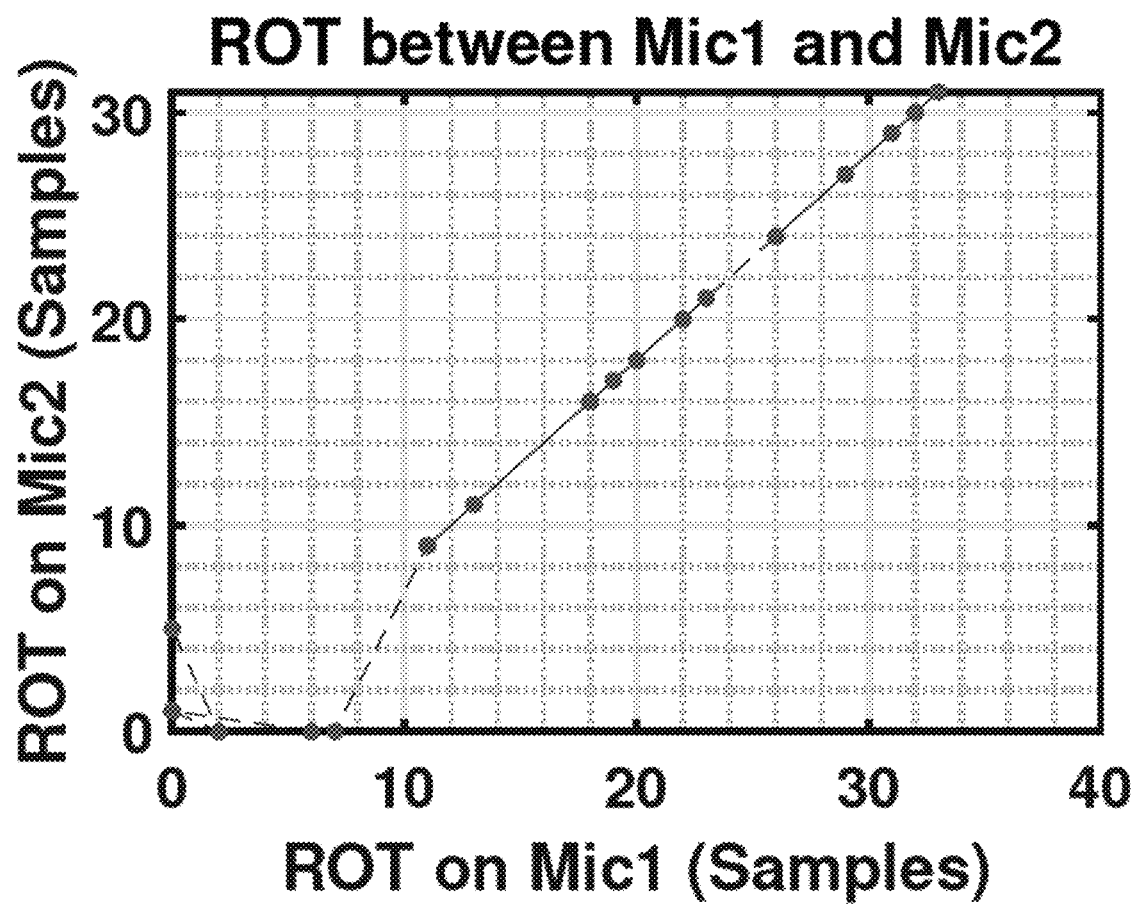
FIGS. 6A, 6B, 6C, and 6D show cleansed low dimensional (2D) projected calibration manifolds from the high dimension (N=8) acoustic sensor space according to an embodiment.
Figure 6B:
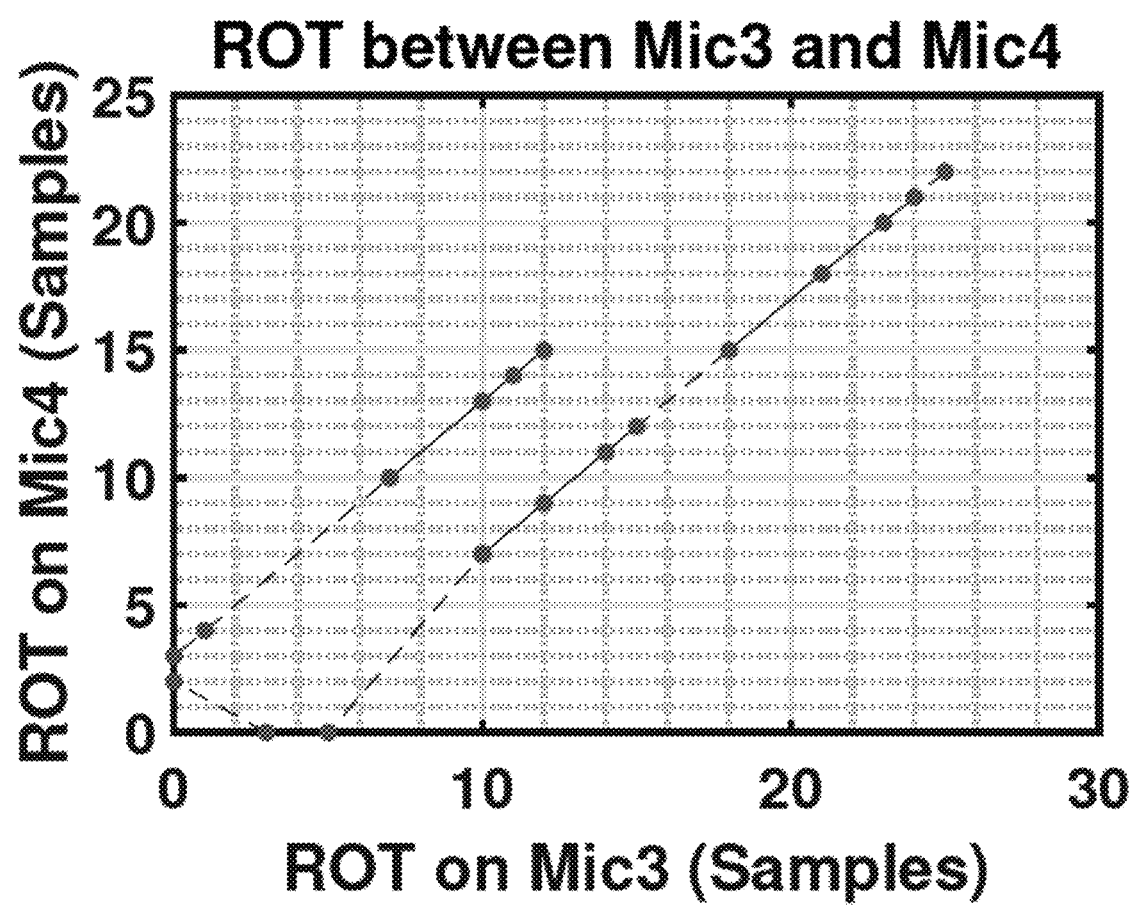
Figure 6C:
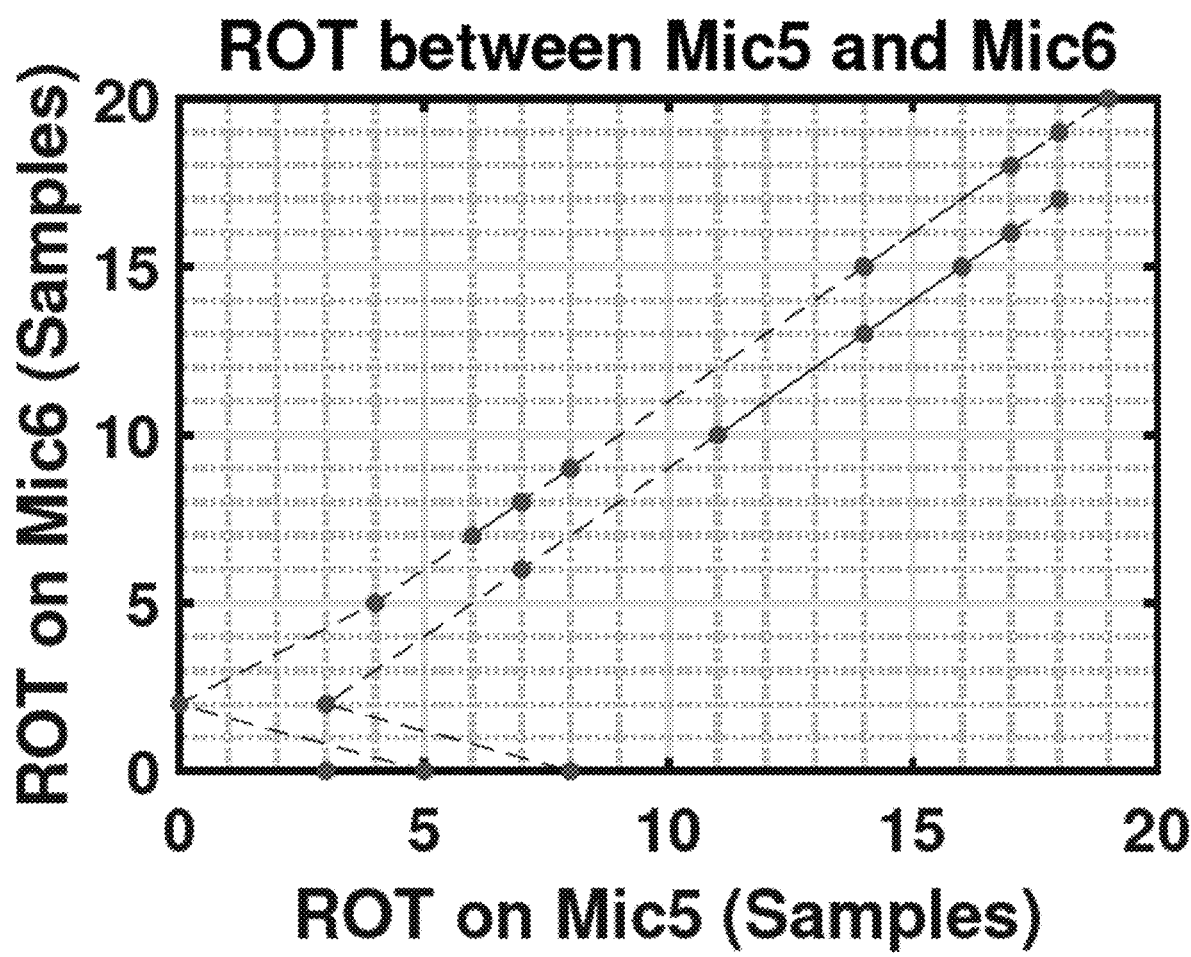
Figure 6D:
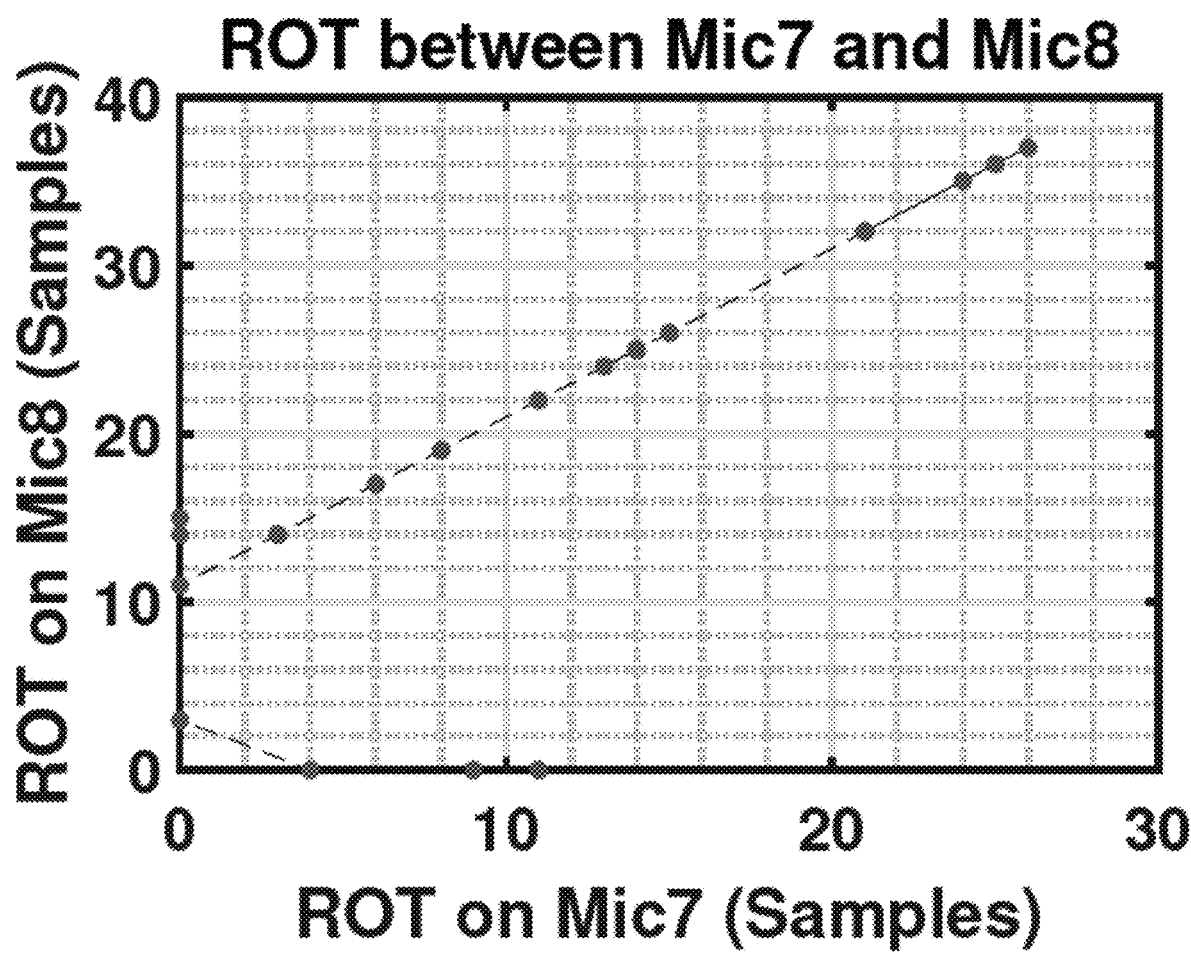

FIGS. 6A, 6B, 6C, and 6D show cleansed low dimensional (2D) projected calibration manifolds from the high dimension (N=8) acoustic sensor space. FIG. 6A is a 2D manifold projection in acoustic sensors 330a and 330b space; FIG. 6B is a 2D manifold projection in acoustic sensors 330c and 330d space; FIG. 6C is a 2D manifold projection in acoustic sensors 330e and 330f space; and FIG. 6D is a 2D manifold projection in acoustic sensors 330g and 330h space. As shown in FIGS. 6A through 6D, there is a separable 1 dimensional manifold in each 2D projection. The cleansed calibration manifold $\mathcal{M}$ may then be used to generate a set of virtual onset times $\mathcal{U}$ for the localization process discussed with respect to FIG. 7.

Figure 7:
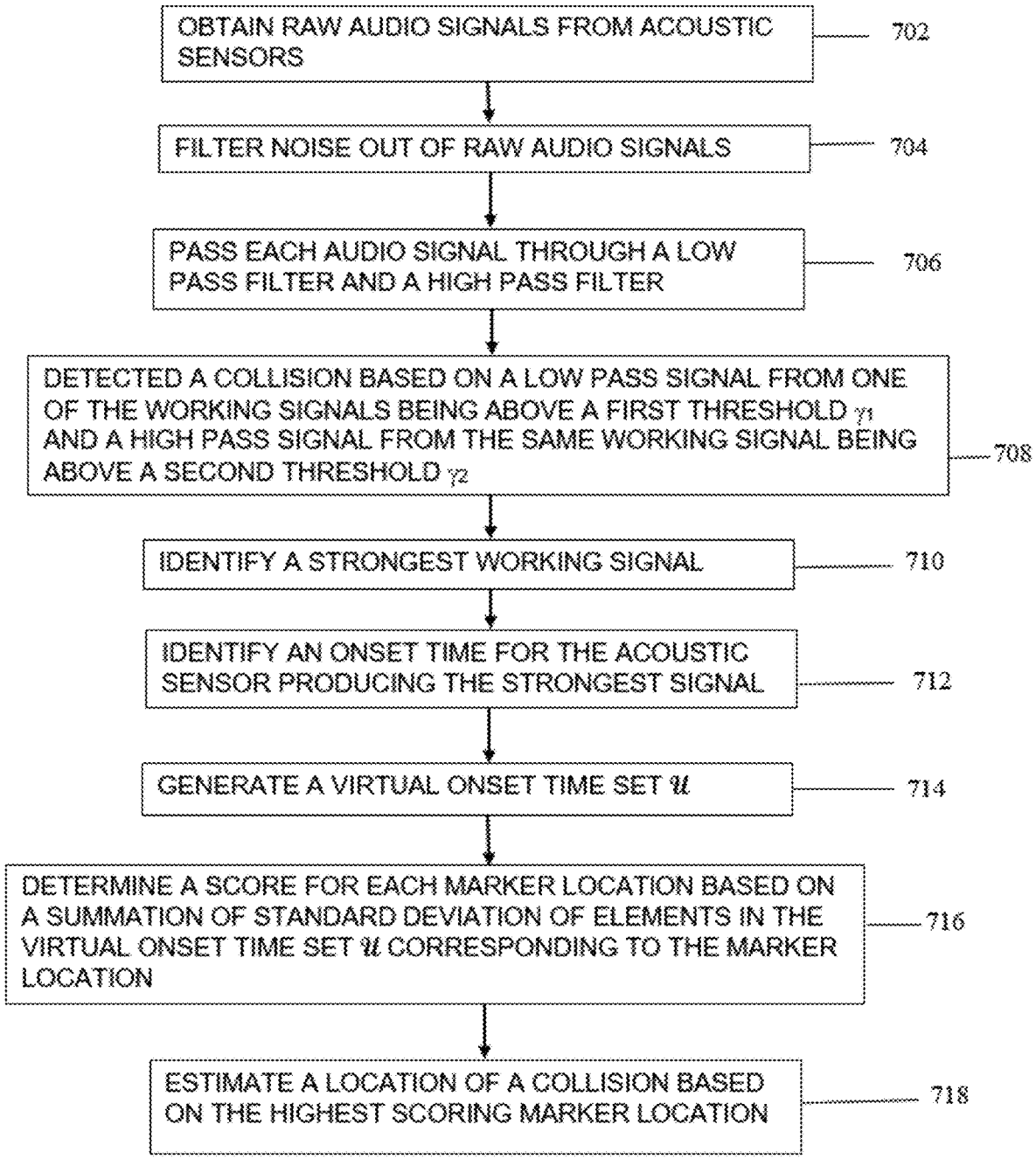
FIG. 7 is a flowchart showing a collision detection and localization method according to an embodiment.

FIG. 7 is a flowchart showing a collision detection and localization method according to an embodiment. The method of FIG. 7 will be discussed with relation to the robotic arm 300 of FIG. 3 for explanatory purposes. However, the disclosure is not limited to this specific application and encompasses other robotic devices.

As shown in FIG. 7, the method may include obtaining raw audio signals from each of a plurality of acoustic sensors 330a-330h on the robotic arm 300 (operation 702).

Working audio signals for each acoustic sensor 330a-330h may be obtained from the raw audio signals by filtering out noise (operation 704). For example, if the robotic arm is moving, the fundamental frequencies of the motors or actuators may be filtered out. The fundamental frequency may be determined through a calibration process that detects the acoustic waves produced by the motors of the robotic device.

Figure 8:
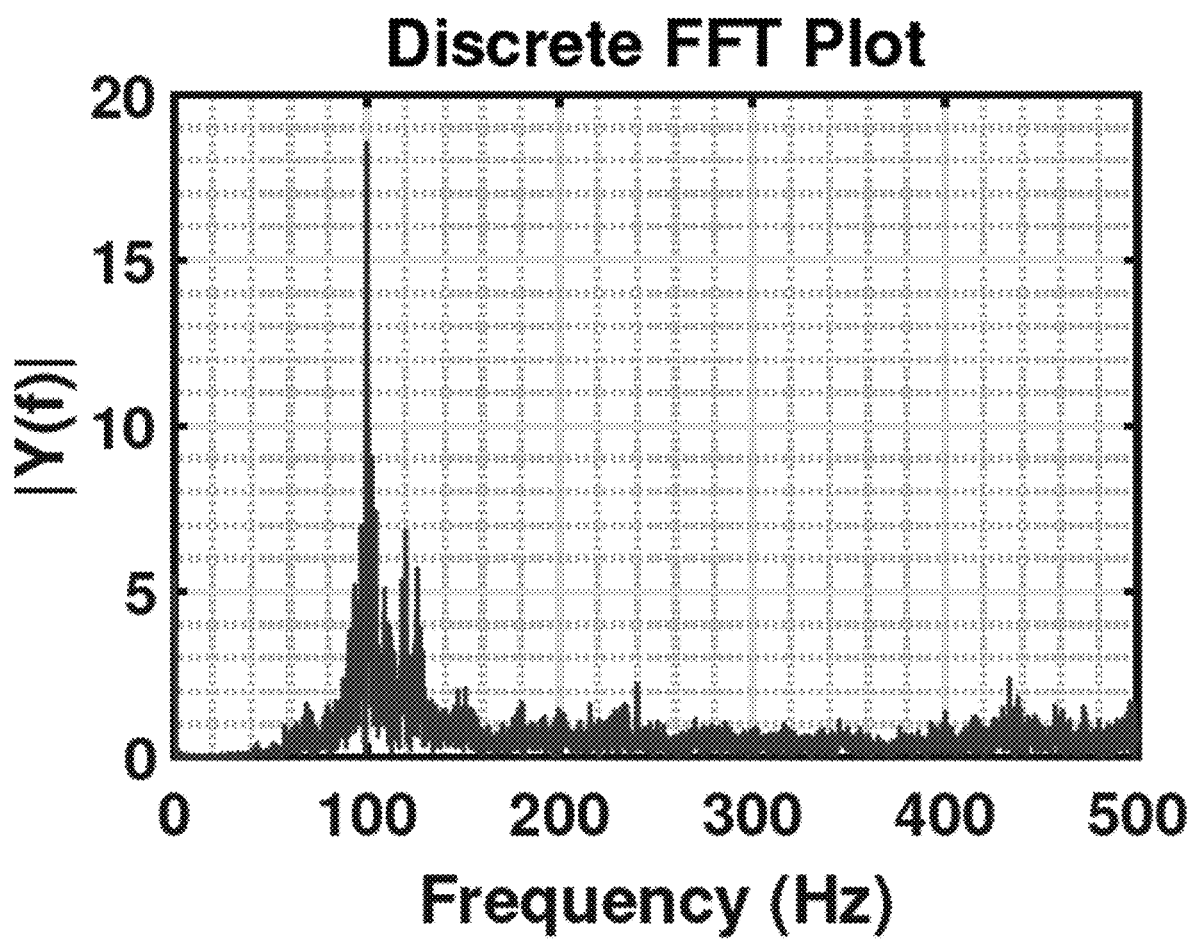
FIG. 8 is a graph showing a frequency spectrum of a raw audio signal before filtering according to an embodiment.
Figure 9:
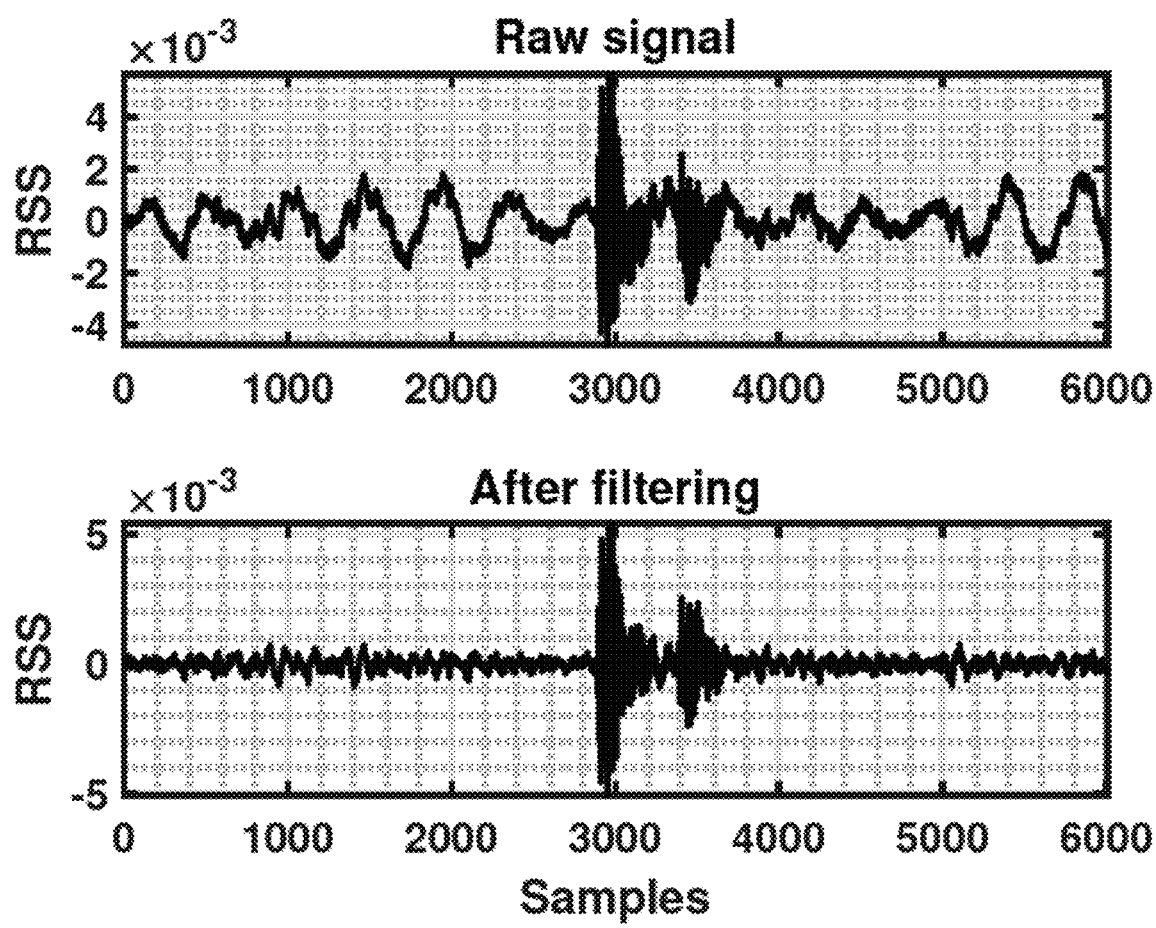
FIG. 9 is a graph showing a raw audio signal (top) and a filtered audio signal (bottom) according to an embodiment.

As shown in FIG. 8, the fundamental frequency of the motors in the robotic arm 300 may be focused tightly around 100 Hz. To attenuate the noise caused by operation of the motors, a band stop filter centered at the fundamental frequency may be applied to the raw audio signals when the robotic arm is in motion. For example, with respect to the robotic arm 300, which has a fundamental frequency centered at 100 Hz, a bandstop filter centered at 100 Hz may be applied. As shown in the upper graph of FIG. 9, before filtering, the raw signal may include a large amount of noise not associated with the collision. Once the signal is filtered to remove the noise caused by the motors, as shown in the lower graph of FIG. 9, the signal produced by the collision is provided more clearly resulting in more accurate collision detection and localization.

To detect on-robot collisions, signals produced by impulsive off-robot sounds may be removed from the working signals. Accordingly, the working audio signals may each be passed through a low pass filter (LPF) and a high pass filter (HPF) to produce a low pass signal and a high pass signal for each working signal (operation 706).

The LPF may be applied to attenuate over-the-air signals within the working audio signals. On-robot collisions introduce micro vibrations along the robot body which translate to a significantly higher amount of infrasound energy. By passing the working signals through a LPF, portions of the signal caused by the over-the-air sounds may be reduced below the noise floor.

Figure 10:
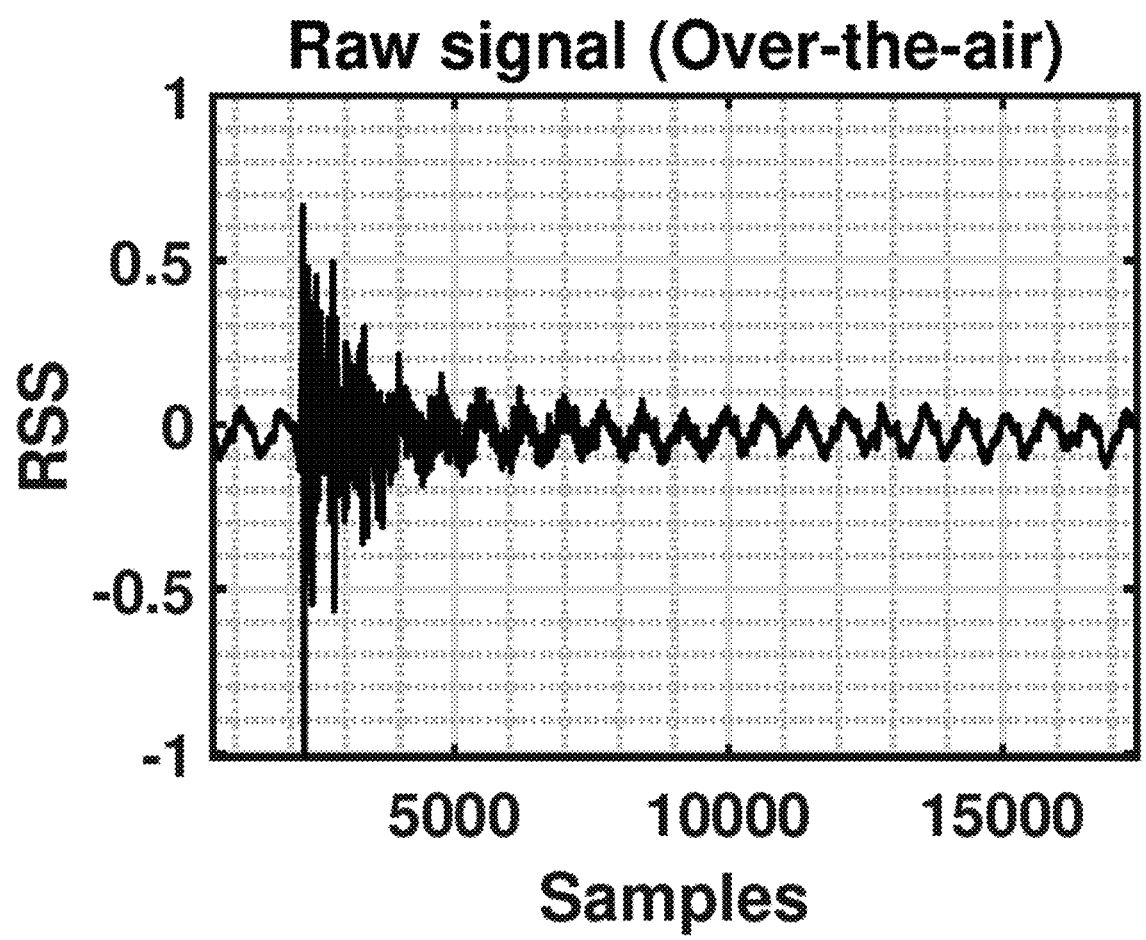
FIG. 10 is a graph showing a signal obtained by an acoustic sensor due to an impact in the surrounding area that reached the acoustic sensor over-the-air according to an embodiment.
Figure 11:
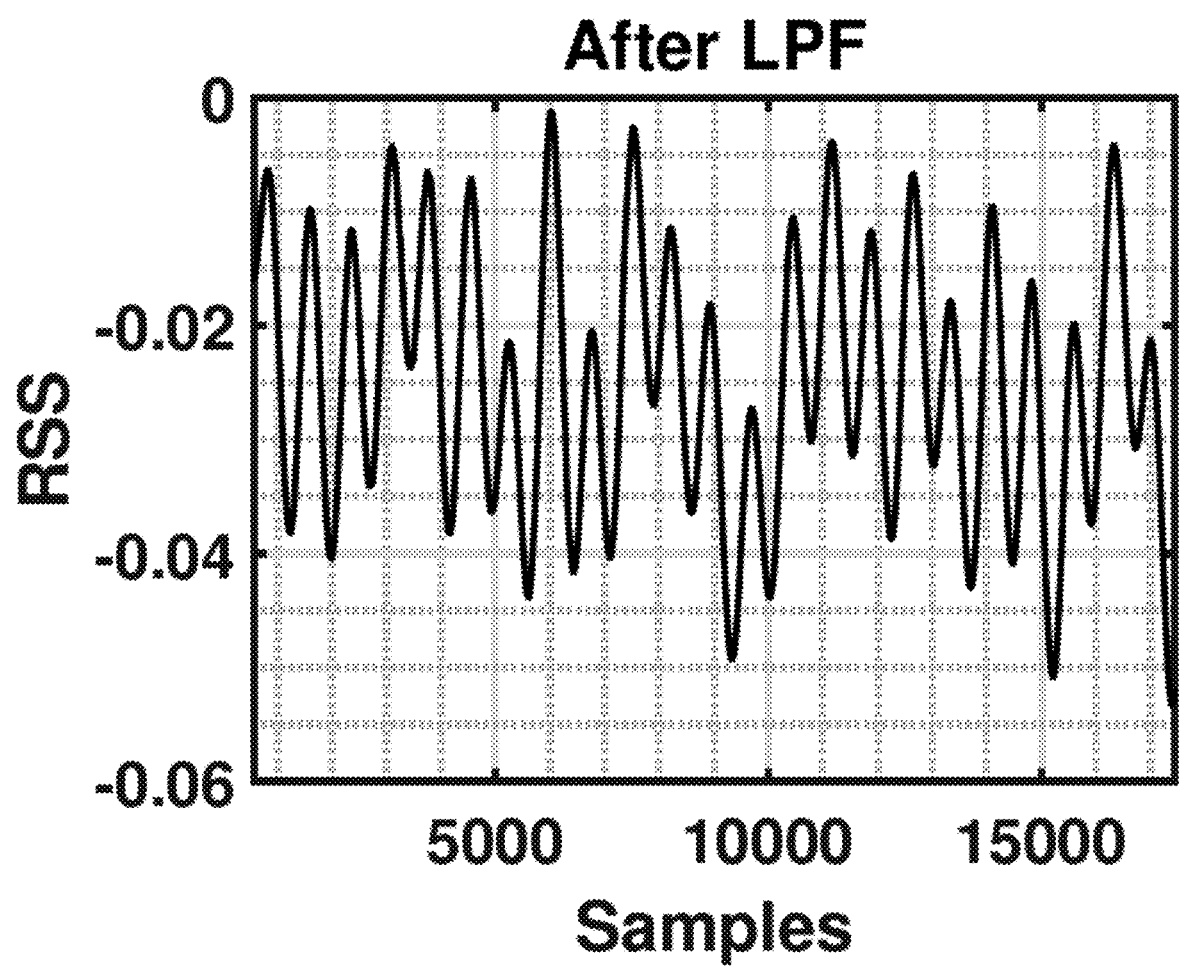
FIG. 11 is a graph showing the signal of FIG. 10 after it has been passed through a low pass filter according to an embodiment.

FIG. 10 shows a graph of a signal obtained by an acoustic sensor 330 on the robotic arm 300 due to an impact in the surrounding area that reached the acoustic sensor 330 over-the-air (OTA). As shown in FIG. 10, a large amplitude signal is produced by the OTA sound. To attenuate this signal, which may produce a false positive on-robot collision detection, the signal may be passed through a LPF. FIG. 11 shows the signal of FIG. 10 after it has been passed through a LPF having a cutoff frequency of 200 Hz. As shown in FIG. 11, the large amplitude portions of the signal caused by the OTA sounds have been attenuated.

Figure 12:
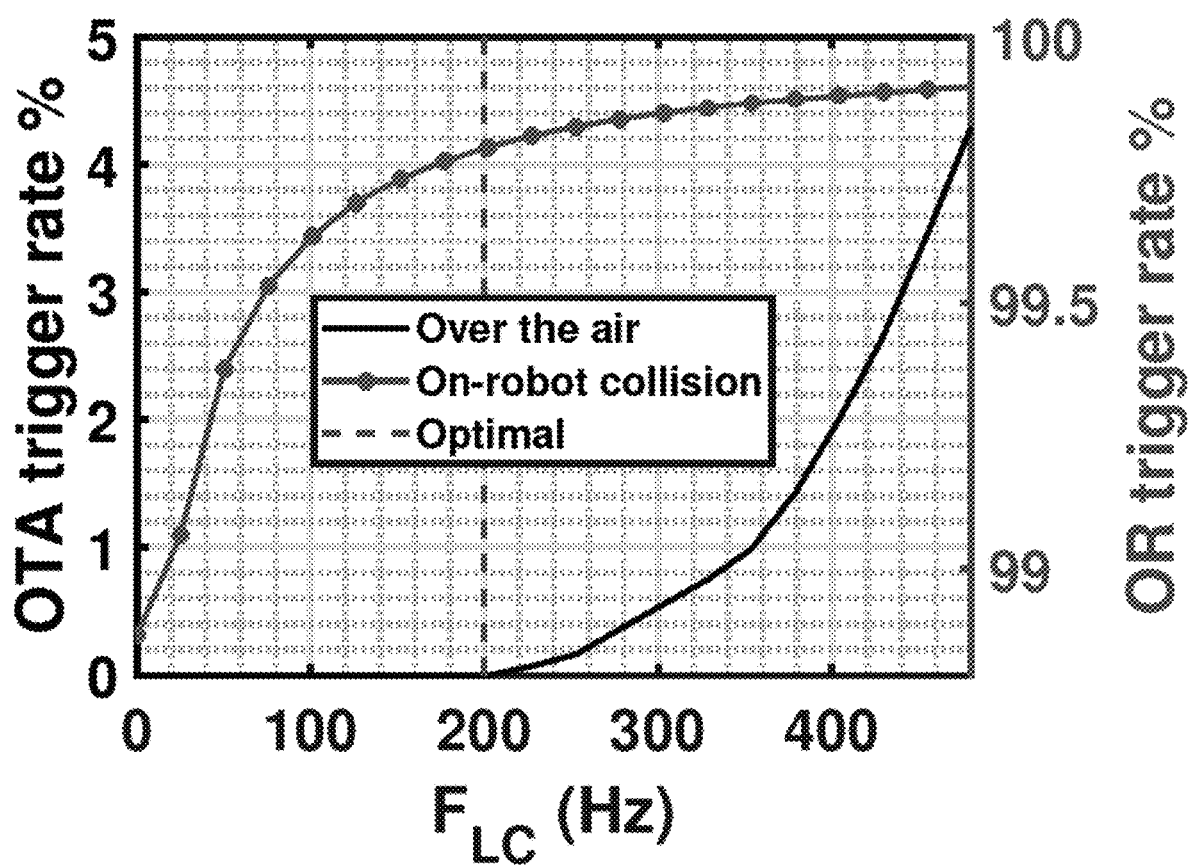
FIG. 12 is a graph showing over-the-air sound trigger rates and on-robot collision trigger rates versus multiple low pass filter cutoff frequencies according to an embodiment.

An optimal cut off frequency for the LPF may be determined through evaluating trigger rates (rate of false positive on-robot collisions) from OTA sound sources and on-robot collisions in different LPF cutoff frequencies ($F_{LC}$). FIG. 12 is a graph showing OTA sound trigger rates and on-robot collision trigger rates versus multiple $F_{LC}$. As shown in FIG. 12, for the example robotic arm shown in FIG. 3, the OTA trigger rate stays close to zero percent before 200 Hz while the on-robot trigger rate increases to about 99.7% at 200 Hz. Accordingly, for this example embodiment, 200 Hz is selected as an optimal cutoff frequency for the LPF.

The HPF may be applied to remove signals caused by collisions on the floor, table, or base (OTF) supporting the robotic device. OTF collisions may generate infrasound energy that can be detected by the acoustic sensors 330. However, in wave propagation, the high frequency components attenuate exponentially faster than low frequency components. Also, when compared to audio signals propagating in the air, solid materials such as wood and concrete floor absorb several magnitudes more energy in the whole spectrum. Accordingly, a HPF may be applied to attenuate signals produced by OTF collision.

Figure 13:
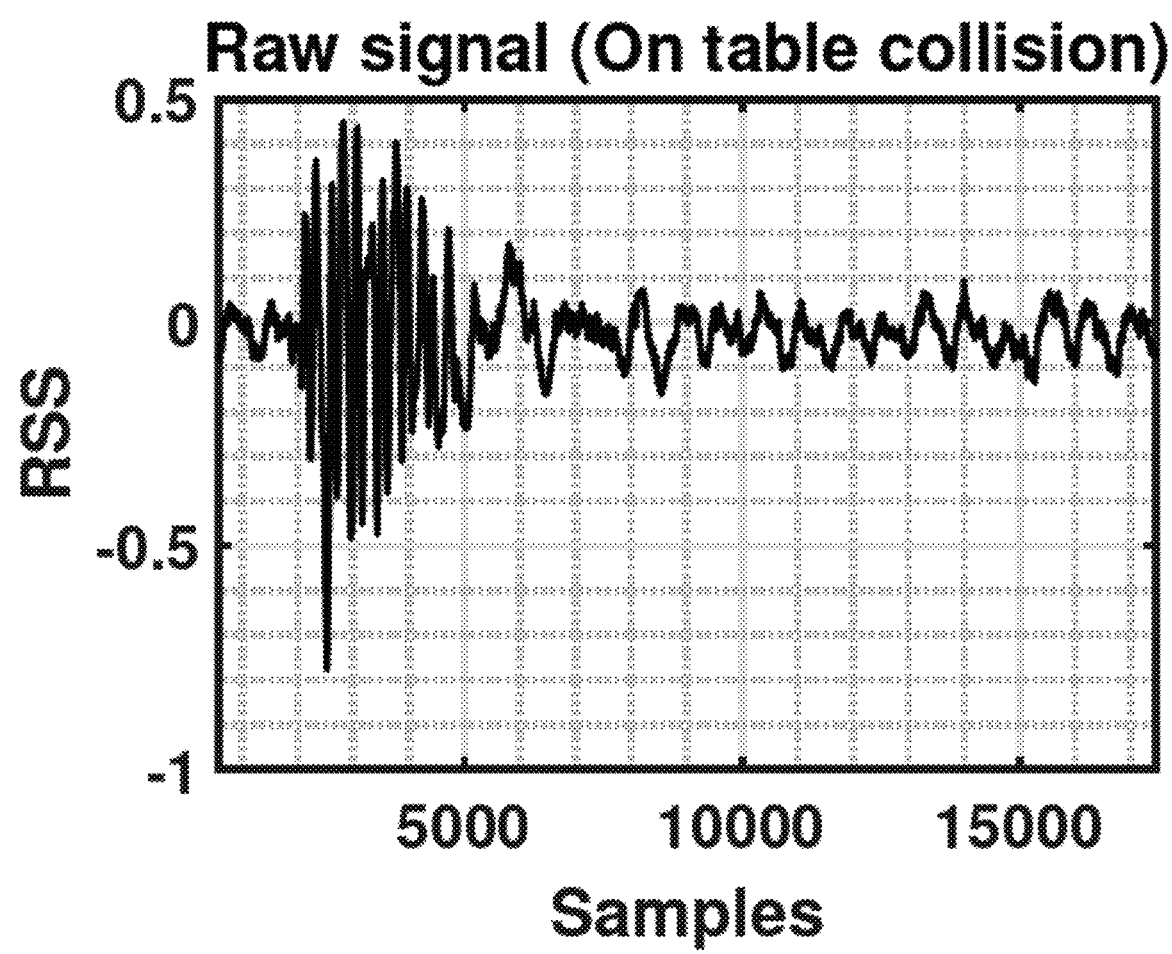
FIG. 13 is a graph showing an example of a signal obtained by an acoustic sensor an on-table collision according to an embodiment.
Figure 14:
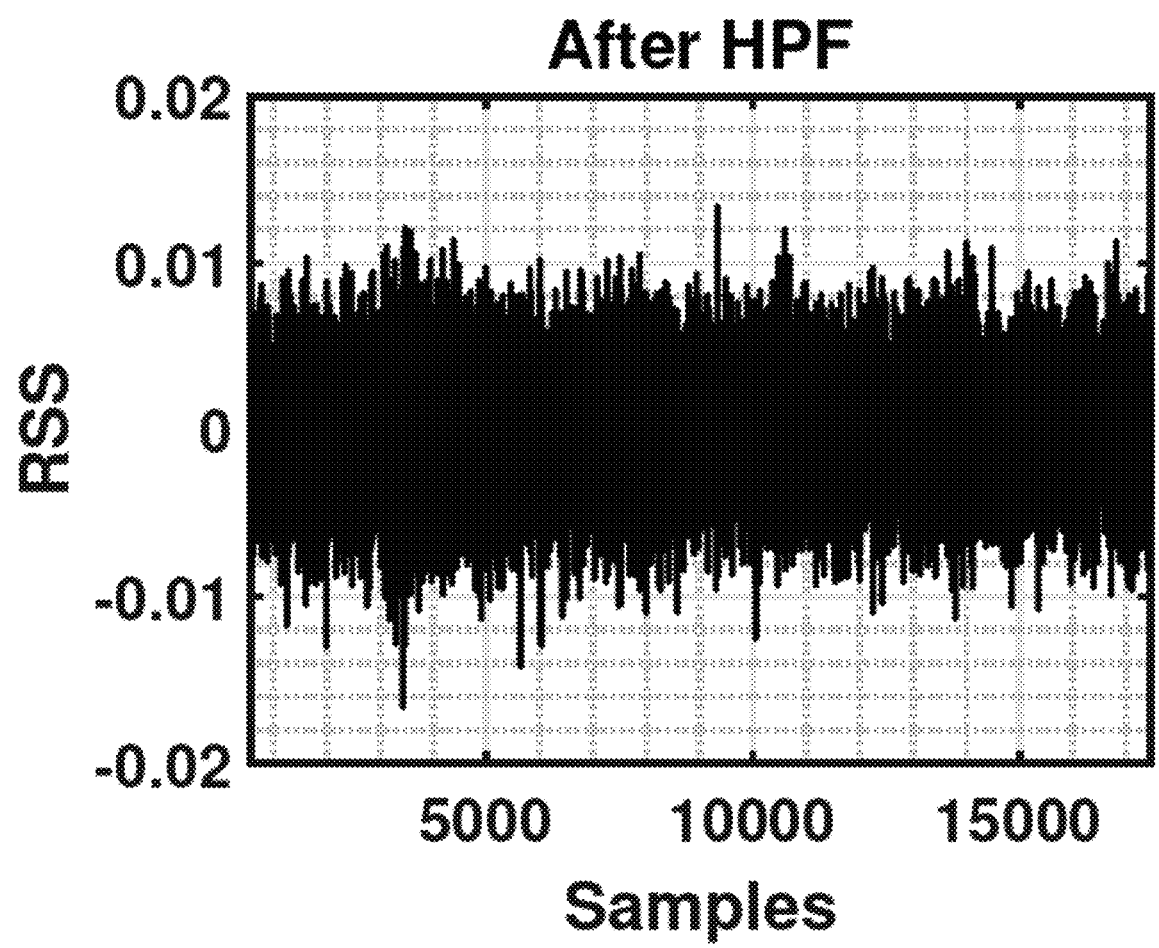
FIG. 14 is a graph showing the signal of FIG. 13 after it has passed through a high pass filter according to an embodiment.

FIG. 13 shows an example of a signal obtained by an acoustic sensor 330 on the robotic arm 300 due to an OTF collision. As shown in FIG. 13, a large amplitude signal is produced by wave propagation through the robotic arm. To attenuate this signal, which may produce a false positive on-robot collision detection, the signal may be passed through a HPF. FIG. 14 shows the signal of FIG. 13 after it has passed through a HPF having a cutoff frequency of 10 KHz. As shown in FIG. 14, the large amplitude portions of the signal, that are caused by the on table collision, have been attenuated.

Figure 15:
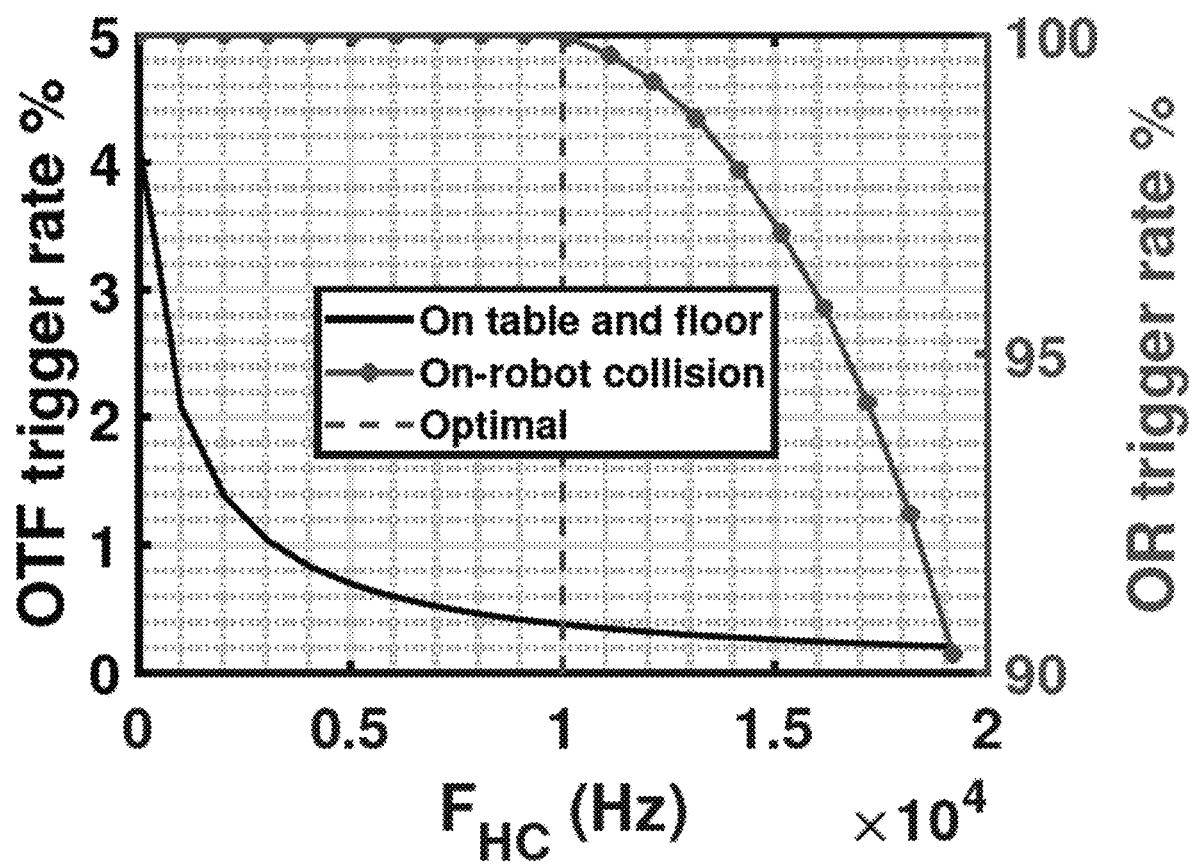
FIG. 15 is a graph showing on-table sound trigger rates and on-robot collision trigger rates versus high pass filter cutoff frequencies according to an embodiment.

An optimal cut off frequency for the HPF may be determined through evaluating trigger rates (rate of false positive on-robot collisions) from OTF sound sources and on-robot collisions in different high pass filter cutoff frequencies ($F_{HC}$). FIG. 15 shows OTA sound trigger rates and on-robot collision trigger rates versus HPF cutoff frequencies. As shown in FIG. 15, for the example robotic arm shown in FIG. 3, the on-robot trigger rate stays close to one hundred percent before 10 KHz and begins to decrease after 10 KHz, while the OTF trigger rate begins dropping sharply before 10 KHz and stays lower than 0.4% after 10 KHz. Accordingly, in this example embodiment, 10 KHz is selected as an optimal cutoff frequency for the HPF.

In operation 708, a collision may be detected based on a low pass signal from one of the working signals being above a first threshold $\gamma_1$ and a high pass signal from the same working signal being above a second threshold $\gamma_2$. In an example embodiment, an on-robot collision may be detected using the following Algorithm 2.

```
                                                              (2)
1:      function DETECTION(s₁, s₂...s_N)
2:          for i ← 1 to N do
3:              sL_i ← LPF (s_i)
4:              sH_i ← HPF (s_i)
5:              if (∥sL_i∥_inf) ≥ γ₁ & (∥sH_i∥_inf) ≥ γ₂ then
6:                  return on-robot collision detected
7:              end if
8:          end for
9:      end function
``` where N represent the number of acoustic sensors 330, Si represents the working signal produced by the ith acoustic sensor, and $\gamma_1$ and $\gamma_2$ are preset thresholds. Thresholds $\gamma_1$ and $\gamma_2$ may be determined through experimentation or a predefined map that corresponds to different types of robotic devices. For example, $\gamma_1$ and $\gamma_2$ can be set to three times the standard deviation of the noise floor.

Once a collision has been detected in operation 608, a strongest working signal may be identified (operation 710). The strongest working signal may be determined based on amplitude, amplitude over a period of time, rate of change in amplitude, as well as other methods known in the art.

An onset time for the acoustic sensor producing the strongest signal may then be identified (operation 712). Onset time may represent the amount of time it takes for the waves produced by the on-robot collision to propagate to a respective acoustic sensor. Onset time may be determined by locating a first peak in the respective working signal above an energy threshold $\gamma_3$. For example, $\gamma_3$ may be set to three times the standard deviation of the working signal.

A set of virtual onset times $\mathcal{U}$ may be generated to estimate the onset times for the acoustic sensors other than the acoustic sensor producing the strongest signal (operation 714). To generate the virtual onset time set $\mathcal{U}$, a calibration manifold may be created that represents relative onset times (ROTs) for each acoustic sensor from collisions at preset marker locations 340 on the robotic arm. The calibration manifold may be generated according to the method 500 of FIG. 5.

The virtual onset time set $\mathcal{U}$ may be a series of shifted calibration manifold $\mathcal{M}$ generated based on the equation (3):

$$\mathcal{U} = \mathcal{M} - 1_N^T \otimes \mathcal{M}(i) + 1_M * 1_N^T * t_{ref} \qquad (3)$$

where $1_N$ is a column vector of 1 with N elements, $\mathcal{M}(i)$ is the $i_{th}$ column in $\mathcal{M}$, $\otimes$ is the Kronecker tensor product, and $t_{ref}$ corresponds to the onset time of the acoustic sensors producing strongest signal.

In operation 716, a score is determined for each marker location 340 based on a summation of standard deviation of elements in the virtual onset time set $\mathcal{U}$ corresponding to the marker location. In an embodiment, the score for the $i_{th}$ marker location may be determined based on the following Equation (4):

$$S(i) = \sum_{K=1}^{N} F(\mathcal{U}_i(k))^2 \qquad (4)$$

where F is the scoring function and $\mathcal{U}_i$ is the $i_{th}$ row in the virtual onset time set $\mathcal{U}$. In an example embodiment, $F(\mathcal{U}_i)$ may be defined as the standard deviation within a small window co that expands each element in the virtual onset time set $\mathcal{U}$. In some embodiments, the window length may be between 5 and 25 samples. An optimal window length may be determined based on experimentation.

When there is an upcoming collision, the signal starts to rise and oscillate in a faster rate when the right onset time is found. As such, a higher score value indicates a closer proximity to the collision.

In other embodiments, scoring me be based upon absolute received signal strength (RSS) value at the virtual onset time, the square of the absolute RSS value, the maximum RSS value within a small window, or the average RSS value instead of standard deviation within a small window.

In operation 718, a location of a collision may be estimated based on a the highest scoring marker location. In some embodiments, a location of the collision may estimate by determining a position of a peak of an interpolation of the highest score and at least two adjacent scores based on Algorithm (3):

```
                                                              (3)
1:      function LOCALIZATION (S)
2:          k = argmax(S)
3:          if k == 1 then
4:              C = QuadraticFit([S(1), S(2), S(3)])
5:          else
6:              if k == N then
7:                  C = QuadraticFit([S(k), S(k − 1), S(k − 2)])
8:              end if
9:              C = QuadraticFit([S(k − 1), S(k), S(k + 1)])
10:         end if
11:         return argmax(C)
12:     end function
```

Figure 16:
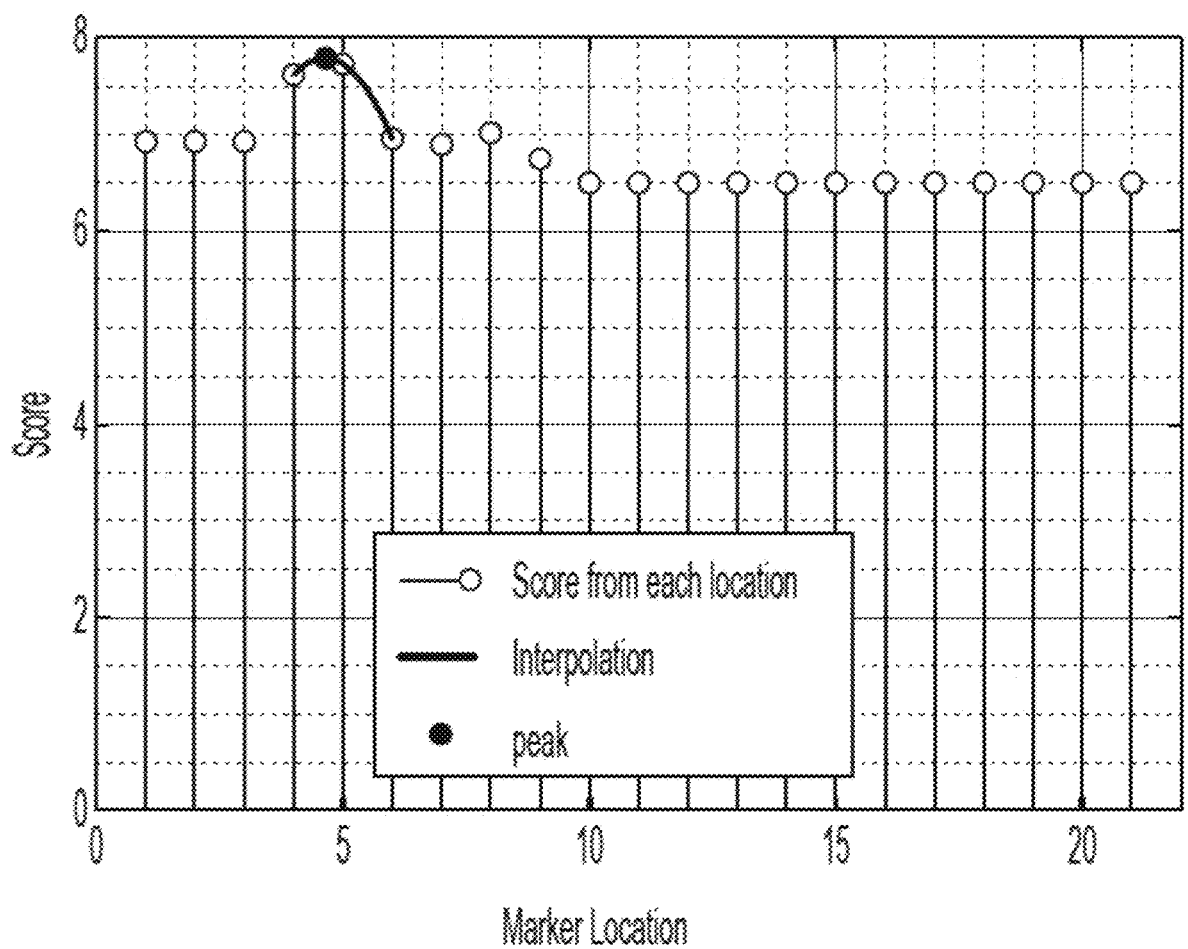
FIG. 16 is a graph showing an interpolation of highest scoring marker locations according to an embodiment.

As shown in FIG. 16, which shows the results of Algorithm 3 being applied to scoring data, a quadratic fit cure may be fit to the marker location having the highest score and the scores of the two adjacent marker locations. A location of the collision may then be determined based on a location of peak of the curve. For example, if the peak of the curve in positioned halfway between adjacent markers, the location will be estimated as being halfway between the adjacent markers.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method of collision localization for a robotic device comprising:
    obtaining audio signals from a plurality of acoustic sensors spaced apart along a robotic arm of the robotic device, wherein the plurality of markers is evenly spaced on the robotic arm of the robotic device and an amount of locations of the plurality of markers is adjusted based on a size of the robotic arm;
    identifying, based on a collision being detected, a strongest audio signal among the obtained audio signals;
    identifying a primary onset time for an acoustic sensor producing the strongest audio signal, the primary onset time being a time at which waves propagating from the collision reach the acoustic sensor producing the strongest audio signal;
    generating a virtual onset time set, by shifting a calibration manifold, based on the identified primary onset time,
    wherein the calibration manifold is an M×N dimension manifold where M corresponds to an amount of marker locations and N corresponds to an amount of the plurality of acoustic sensors and the calibration manifold comprising relative onset time vector data for the collision,
    wherein the virtual onset time set comprises onset time relative to each of other acoustic sensors relative to the primary onset time;
    determining scores for the marker locations based a standard deviation of relative onset times in the virtual onset time set, the scores for the marker locations being determined based on a summation of the standard deviation of the relative onset times in the virtual onset time set corresponding to a marker location; and
    estimating a location of the collision based on a highest score of the determined scores,
    wherein the method further comprises:
        sequentially colliding an object with each marker location and obtaining onset times for the plurality of acoustic sensors;
        obtaining relative onset times for the collisions by subtracting a shortest onset time of each collision from each remaining onset time of the collision; and
        generating the calibration manifold comprising the relative onset times,
    wherein the estimating of the location of the collision based on the highest score of the determined scores comprises:
        obtaining an interpolation of a highest scoring marker location and marker locations adjacent the highest scoring marker location; and
        estimating the location of the collision based on a position of a peak of the interpolation,
    wherein based on a collision being not identified between acoustic sensors i and i+1, an onset time difference between two adjacent acoustic sensors ($\Delta t(i, i+1)=t_i-t_{i+1}$) is fixed and used to cleanse the calibration manifold M,
    wherein, to detect on-robot collisions, signals produced by impulsive off-robot sounds are removed from the audio signals and each of the audio signals are passed through a low pass filter (LPF) and a high pass filter (HPF) to produce a low pass signal and a high pass signal for each of the audio signals, and
    wherein the LPF is applied to attenuate over-the-air (OTA) signals within the audio signals and the HPF is applied to remove signals caused by collisions on a floor, table, or base (OTF) supporting the robotic device.

2. The method of claim 1, wherein obtaining the audio signals from the plurality of acoustic sensors comprises filtering raw audio signals with a band stop filter if the robotic device is moving or passing the raw audio signals if the robotic device is static, and
    wherein a center frequency of the band stop filter corresponds to a fundamental frequency of a motor powering the robotic device.

3. The method of claim 1, wherein detecting the collision comprises:
    filtering the obtained audio signals to provide low pass audio signals and high pass audio signals for the obtained audio signals; and
    detecting the collision based on a low pass signal, from one obtained audio signal among the obtained audio signals, being above a first threshold, and a high pass signal from the one obtained audio signal, being above a second threshold.

4. The method of claim 1, wherein identifying the primary onset time for the acoustic sensor producing the strongest audio signal comprises identifying a first peak in the strongest audio signal that is above a predetermined energy threshold, and
    wherein the predetermined energy threshold is 3× a standard deviation of the strongest audio signal.

5. The method of claim 1, wherein obtaining the interpolation of the highest scoring marker location and marker locations adjacent the highest scoring marker location comprises generating a quadratic fit curve for the highest scoring marker location and marker locations adjacent the highest scoring marker location.

6. The method of claim 1, wherein the plurality of acoustic sensors are spaced apart along a robotic arm of the robotic device, and
    wherein when a linkage rotates down to align with other linkage, at least some of the plurality of acoustic sensors are spaced apart along two dimensions but remain spaced apart in a third dimension.

7. The method of claim 1, wherein a process of epicenter multilateration for collision localization (EMCL) is used to localize an on-robot collision using the plurality of acoustic sensors on the robotic device,
    Wherein, based on two collisions happening at different locations between a first acoustic sensor and a second acoustic sensor, a difference between a first relative onset time vector (ROT) for a collision, which represents relative onset times for the first acoustic sensor and a second ROT for the second acoustic sensor is changed, and a difference between a third ROT for a third acoustic sensor and a fourth ROT for a fourth acoustic sensor is remained substantially constant, and wherein, based on a collision location gradually moving between acoustic sensor i and acoustic sensor i+1, only a difference between ROT(i) and ROT(i+1) changes.

8. The method of claim 7, wherein the EMCL includes P-wave time difference of arrival (TDoA) calibration to generate the calibration manifold, and
wherein an ROT for each collision is obtained based on the object is collided with the robotic device at each marker location.

9. The method of claim 1, wherein an optimal cut off frequency for the LPF is determined through evaluating trigger rates (rate of false positive on-robot collisions) from over-the-air (OTA) sound sources and on-robot collisions in different LPF cutoff frequencies (FLC) and an optimal cut off frequency for the HPF is determined through evaluating trigger rates (rate of false positive on-robot collisions) from OTF sound sources and on-robot collisions in different high pass filter cutoff frequencies (FHC).

10. The method of claim 1, wherein the scoring is based on at least one of an absolute received signal strength (RSS) value at the virtual onset time, a square of the absolute RSS value, a maximum RSS value within a small window, and an average RSS value.

11. A robotic device comprising:
a plurality of acoustic sensors spaced apart along a robotic arm of the robotic device, wherein the plurality of markers is evenly spaced on the robotic arm of the robotic device and an amount of locations of the plurality of markers is adjusted based on a size of the robotic arm;
a memory configured to store instructions; and
a processor configured to execute the instructions to:
obtain audio signals from the plurality of acoustic sensors;
identify, based on a collision being detected, a strongest audio signal among the obtained audio signals;
identify a primary onset time for an acoustic sensor producing the strongest audio signal, the primary onset time being a time at which waves propagating from the collision reach the acoustic sensor producing the strongest audio signal;
generate a virtual onset time set, by shifting a calibration manifold, based on the identified primary onset time,
wherein the calibration manifold is an M×N dimension manifold where M corresponds to an amount of marker locations and N corresponds to an amount of the plurality of acoustic sensors and the calibration manifold comprising relative onset time vector data for the collision,
wherein the virtual onset time set comprises onset time relative to each of other acoustic sensors relative to the primary onset time;
determine scores for the marker locations based a standard deviation of relative onset times in the virtual onset time set, the scores for the marker locations being determined based on a summation of the standard deviation of the relative onset times in the virtual onset time set corresponding to a marker location; and
estimate a location of the collision based on a highest score of the determined scores,
wherein the processor is further configured to:
based on an object sequentially colliding with each marker location,
obtaining onset times for the plurality of acoustic sensors;
obtaining relative onset times for the collisions by subtracting a shortest onset time of each collision from each remaining onset time of the collision;
generate the calibration manifold comprising the relative onset times;
obtain an interpolation of a highest scoring marker location and marker locations adjacent the highest scoring marker location; and
estimate the location of the collision based on a position of a peak of the interpolation,
wherein based on a collision being not identified between acoustic sensors i and i+1, an onset time difference between two adjacent acoustic sensors $(\Delta t(i, i+1)=t_i-t_{i+1})$ is fixed and used to cleanse the calibration manifold M,
wherein, to detect on-robot collisions, signals produced by impulsive off-robot sounds are removed from the audio signals and each of the audio signals are passed through a low pass filter (LPF) and a high pass filter (HPF) to produce a low pass signal and a high pass signal for each of the audio signals, and
wherein the LPF is applied to attenuate over-the-air (OTA) signals within the working audio signals and the HPF is applied to remove signals caused by collisions on a floor, table, or base (OTF) supporting the robotic device.

12. The robotic device of claim 11, wherein the processor is further configured to:
filter raw audio signals with a band stop filter if the robotic device is moving or pass the raw audio signals if the robotic device is static, and
wherein a center frequency of the band stop filter corresponds to a fundamental frequency of a motor powering the robotic device.

13. The robotic device of claim 11, wherein the processor is further configured to:
filter the obtained audio signals to provide low pass audio signals and high pass audio signals for the obtained audio signals; and
detect the collision based on a low pass signal, from one obtained audio signal among the obtained audio signals, being above a first threshold, and a high pass signal from the one obtained audio signal, being above a second threshold.

14. The robotic device of claim 11, wherein the processor is further configured to identify a first peak in the strongest audio signal that is above a predetermined energy threshold, and
wherein the predetermined energy threshold is 3× a standard deviation of the strongest audio signal.

15. The robotic device of claim 11, wherein the processor is further configured to:
generate a quadratic fit curve for the highest scoring marker location and marker locations adjacent the highest scoring marker location.

16. A non-transitory computer-readable medium storing instructions, the instructions comprising: one or more instructions that, when executed by one or more processors of a mobile device, cause the one or more processors to:
obtain audio signals from a plurality of acoustic sensors on a robotic arm of a robotic device, wherein the plurality of markers is evenly spaced on the robotic arm of the robotic device and an amount of locations of the plurality of markers is adjusted based on a size of the robotic arm;

identify, based on a collision being detected, a strongest audio signal among the obtained audio signals;

identify a primary onset time for an acoustic sensor producing the strongest audio signal, the primary onset time being a time at which waves propagating from the collision reach the acoustic sensor producing the strongest audio signal;

generate a virtual onset time set, by shifting a calibration manifold, based on the identified primary onset time, wherein the calibration manifold is an M×N dimension manifold where M corresponds to an amount of marker locations and N corresponds to an amount of the plurality of acoustic sensors and the calibration manifold comprising relative onset time vector data for each collision, wherein the virtual onset time set comprises onset time relative to each of other acoustic sensors relative to the primary onset time;

determine scores for the marker locations based a standard deviation of relative onset times in the virtual onset time set, the scores for the marker locations being determined based on a summation of the standard deviation of the relative onset times in the virtual onset time set corresponding to a marker location; and estimate a location of the collision based on a highest score of the determined scores, wherein the instructions further cause the one or more processors to:

based on an object sequentially colliding with each marker location, obtaining onset times for the plurality of acoustic sensors;

obtaining relative onset times for the collisions by subtracting a shortest onset time of each collision from each remaining onset time of the collision;

generate the calibration manifold comprising the relative onset times;

obtain an interpolation of a highest scoring marker location and marker locations adjacent the highest scoring marker location; and estimate the location of the collision based on a position of a peak of the interpolation, wherein based on a collision being not identified between acoustic sensors i and i+1, an onset time difference between two adjacent acoustic sensors ($\Delta t(i, i+1) = t_i - t_{i+1}$) is fixed and used to cleanse the calibration manifold M, wherein, to detect on-robot collisions, signals produced by impulsive off-robot sounds are removed from the audio signals and each of the audio signals are passed through a low pass filter (LPF) and a high pass filter (HPF) to produce a low pass signal and a high pass signal for each of the audio signals, and wherein the LPF is applied to attenuate over-the-air (OTA) signals within the audio signals and the HPF is applied to remove signals caused by collisions on a floor, table, or base (OTF) supporting the robotic device.

* * * * *